United States Patent
Hashimoto et al.

(10) Patent No.: US 7,251,536 B2
(45) Date of Patent: *Jul. 31, 2007

(54) CONTROL SYSTEM FOR PLANT

(75) Inventors: Eiji Hashimoto, Wako (JP); Tetsuya Ishiguro, Wako (JP); Masahiro Sato, Wako (JP); Shusuke Akazaki, Wako (JP); Yoshihisa Iwaki, Wako (JP); Yuji Yasui, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 386 days.

This patent is subject to a terminal disclaimer.

(21) Appl. No.: 10/656,382

(22) Filed: Sep. 5, 2003

(65) Prior Publication Data

US 2004/0049296 A1  Mar. 11, 2004

(30) Foreign Application Priority Data

Sep. 5, 2002 (JP) ............................. 2002-260392

(51) Int. Cl.
*G05B 13/02* (2006.01)
(52) U.S. Cl. ..................... 700/29; 700/40; 700/28; 701/103
(58) Field of Classification Search ................ 700/29, 700/40, 28, 103, 31, 19; 123/19–42, 250; 60/276, 285; 701/103
See application file for complete search history.

(56) References Cited

U.S. PATENT DOCUMENTS

| 5,687,077 | A  | * | 11/1997 | Gough, Jr. ................. 700/29 |
| 5,869,744 | A  | * | 2/1999  | Suzuki et al. ............... 73/23.32 |
| 6,082,099 | A  | * | 7/2000  | Yasui et al. .................... 60/276 |
| 6,256,983 | B1 | * | 7/2001  | Yasui ........................... 60/285 |
| 6,680,812 | B1 | * | 1/2004  | Iwashiro .................. 360/78.06 |
| 2003/0009240 | A1 | * | 1/2003 | Yasui et al. .................... 700/40 |
| 2003/0028264 | A1 | * | 2/2003 | Yasui et al. .................... 700/29 |
| 2003/0139826 | A1 | * | 7/2003 | Yasui et al. .................... 700/31 |

FOREIGN PATENT DOCUMENTS

| JP | 63-116205     | 5/1988 |
| JP | 2-37402       | 2/1990 |
| JP | 2000-110636 A1 | 4/2000 |
| WO | WO 02/086630 A1 | 4/2002 |

* cited by examiner

*Primary Examiner*—Anthony Knight
*Assistant Examiner*—Sunray Chang
(74) *Attorney, Agent, or Firm*—Lahive & Cockfield, LLP; Anthony A. Laurentano, Esq.

(57) ABSTRACT

A control system for a plant is disclosed. The control system includes a controller for controlling the plant based on a controlled object model which is obtained by modeling the plant. The controlled object model is modeled using an input and an output of the plant which are sampled at intervals of a sampling period which is longer than a control period of the controller. The sampled input of the plant is a filtered control output which is obtained by filtering an output of the controller. The controller carries out a control process of the plant at intervals of the control period.

20 Claims, 23 Drawing Sheets

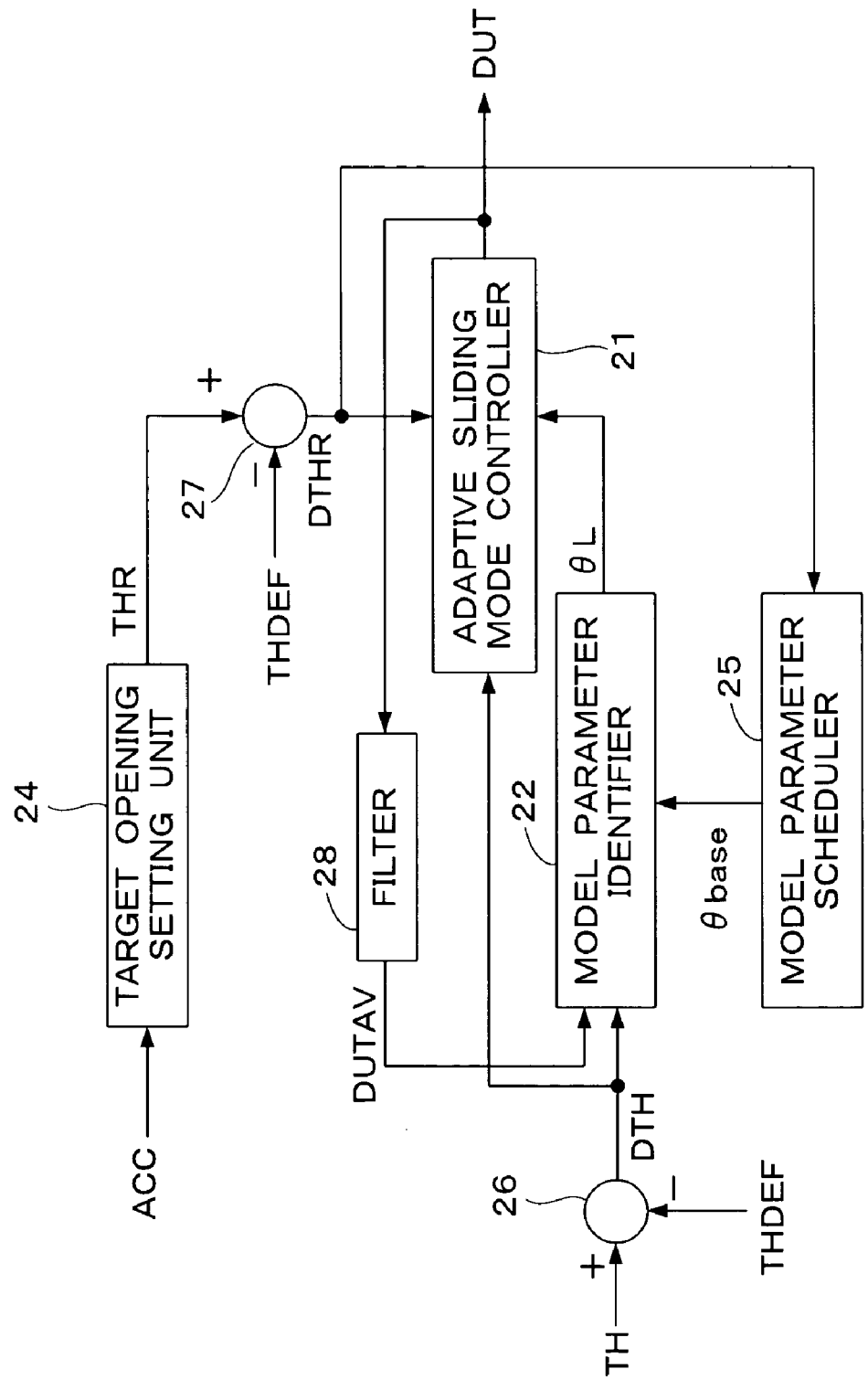

CONTROL SYSTEM FOR PLANT

RELATED APPLICATION

U.S. patent application Ser. No. 10/349,538 entitled CONTROL SYSTEM FOR PLANT invented by Yasui et al, filed on Jan. 22, 2003, assigned to the assignee of the present application, and U.S. patent application filed on Aug. 13, 2003, entitled CONTROL SYSTEM FOR THROTTLE VALVE ACTUATING DEVICE invented by Ishiguro et al., assigned to the assignee of the present application.

BACKGROUND OF THE INVENTION

The present invention relates to a control system for a plant, and more particularly to a control system having a controller for controlling the plant using a controlled object model which is obtained by modeling the plant.

There has been known a sliding mode controller for controlling a plant according to a sliding mode control using a controlled object model which is obtained by modeling the plant (Japanese Patent Laid-open No. 2000-110636, for example). A control period of this sliding mode controller is set to a value which is identical to a sampling period of an input and an output of the plant for defining the controlled object model.

According to the sliding mode control, it is possible to specify a damping characteristic of a control deviation between a control target value and an output of a plant to be controlled. Such a control is referred to as a response-specifying control. Other than the sliding mode control, a back-stepping control is known as a response-specifying control.

If a plant to be controlled has nonlinear disturbance such as friction, then it is necessary to shorten a control period of the controller in order to improve controllability of the plant. Specifically, moving a movable controlled element at a shorter control period makes it possible to eliminate motion discontinuities due to the static friction. In addition, a time period required for the input to reflect a change in the target value, i.e., the dead time of the plant control becomes longer, as the control period becomes longer. Therefore, it is effective to reduce the control period also for the purpose of improving performance of the plant output to follow the target value.

However, if the control period of the controller is set to a smaller value for improving controllability and the sampling period for defining a controlled object model of the plant is set to a value which is equal to the control period, the problems described below may occur.

If a change rate of the plant output is low compared with the control period (i.e., the plant output changes a little in a control period), then model parameters representing the characteristics of the controlled object model are identified according to data sampled at a relatively short period compared with the change rate of the plant output. Therefore, an amount of change in the sampled data (a difference between the two adjacent sampled data) is small, and the model parameters identified according to the sampled data are unable to accurately represent the dynamic characteristics of the plant.

According to the response-specifying control such as a sliding mode control described above, a feedback input is determined based on a function which specifies a damping characteristic of the control deviation. If data sampled at intervals of a short period are used, then an amount of change in the control deviation (the difference between a control deviation calculated from sampled data in the preceding cycle and a control deviation calculated from sampled data in the present cycle) becomes small. Accordingly, a value calculated by the above function becomes near zero, which makes a sensitivity of the feedback process lower. As a result, the specified response may not be achieved in some cases.

SUMMARY OF THE INVENTION

It is an object of the present invention to provide a control system for a plant which is capable of accurately approximating the characteristics of a controlled object model to the characteristics of a plant which is an actual controlled object, and improving controllability using a short control period.

To achieve the above object, the present invention provides a control system for a plant, including a controller (21) for controlling the plant based on a controlled object model which is obtained by modeling the plant. The controlled object model is modeled using an input and an output of the plant which are sampled at intervals of a sampling period ($\Delta$TID) which is longer than a control period ($\Delta$TCTL) of the controller (21). The sampled input of the plant is a filtered control output (DUTAV) which is obtained by filtering an output (DUT) of the controller (21). The controller (21) carries out a control process (FIG. 4) of the plant at intervals of the control period ($\Delta$TCTL).

With this configuration, the plant is controlled based on the controlled object model which is modeled using the input and the output of the plant which are sampled at intervals of the sampling period that is longer than the control period of the controller. Therefore, when the control process is carried out at intervals of a control period which is shorter than a period corresponding to the operating frequency range of the plant, in order to shorten the dead time and compensate for dynamic characteristics such as the friction characteristics, the dynamic characteristics of the controlled object model can be accurately approximated to the actual dynamic characteristics of the plant. Further, since the control period of the controller is shorter than the sampling period of the input and the output of the plant, the output of the controller, i.e., the input of the plant, normally changes at intervals of a period corresponding to the control period. Therefore, by performing the filtering process that attenuates high frequency components of the output of the controller and setting the filtered output of the controller as the sampled input of the plant, variations in the input applied to the controlled object model, which correspond to the relatively short control period, can be effectively suppressed. As a result, the accuracy of the controlled object model becomes higher (the modeling error is reduced) so that the controllability of the plant can be improved. The modeling error is a difference between the actual characteristics of the controlled object and the characteristics of the controlled object model.

Preferably, the controller (21) performs a feedback control of calculating the output (DUT) of the controller to make the output (DTH) of the plant coincide with a target value (DTHR), the controller (21) being capable of specifying a damping characteristic of a deviation between the output (DTH) of the plant and the target value (DTHR).

Preferably, the controller (21) is a sliding mode controller.

Preferably, the sliding mode controller (21) calculates a value ($\sigma$) of a switching function defined as a linear function of the deviation between the output (DTH) of the plant and the target value (DTHR), and a sampling time interval of the deviation which is used to calculate the value ($\sigma$) of the switching function is equal to the sampling period ($\Delta$TID).

Preferably, the control system further includes an identifier (22) for identifying at least one model parameter ($\theta$) of the controlled object model. The controller (21) calculates the output (DUT) of the controller using the at least one model parameter ($\theta$) identified by the identifier (22), and the identifier (22) identifies the at least one model parameter ($\theta$) at intervals of the sampling period ($\Delta$TID), using the filtered output (DUTAV) of the controller.

Preferably, the plant includes a throttle valve (3) of an internal combustion engine (1) and a throttle valve actuating device (10) having an actuator (6) for actuating the throttle valve (3), and the controller (21) calculates a parameter (DUT) for determining a control input to be applied to the throttle valve actuating device (10) to make an opening (TH) of the throttle valve (3) coincide with a target opening (THR).

The present invention provides another control system for a plant, including an identifier (22), a controller (21), and a filter (28). The identifier identifies at least one model parameter ($\theta$) of a controlled object model which is obtained by modeling the plant. The controller (21) controls the plant using the at least one model parameter ($\theta$) identified by the identifier (22). The controller (21) carries out a control process (FIG. 4) of the plant at intervals of a control period ($\Delta$TCTL). The filter (28) filters an output (DUT) of the controller (21). The controlled object model is modeled using an input and an output of the plant which are sampled at intervals of a sampling period ($\Delta$TID) which is longer than the control period ($\Delta$TCTL) of the controller (22), and the identifier (22) identifies the at least one model parameter ($\theta$) based on an output (DUTAV) of the filter (28) and the output (DTH) of the plant.

BRIEF DESCRIPTION OF THE DRAWINGS

FIG. 2 is a functional block diagram showing functions realized by an electronic control unit (ECU) shown in FIG. 1;

DETAILED DESCRIPTION OF THE PREFERRED EMBODIMENTS

The preferred embodiments of the present invention will be described with reference to the drawings.

First Embodiment

Figure 1:
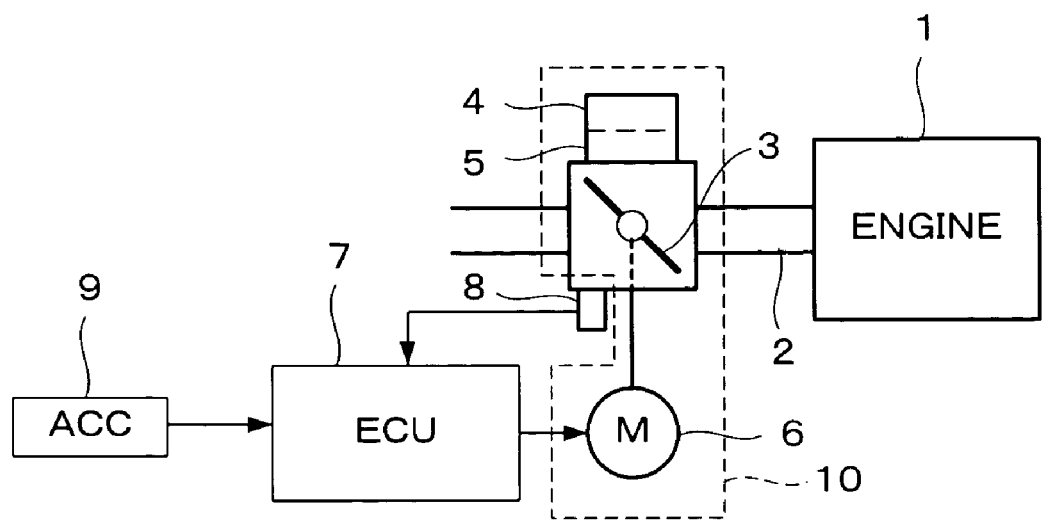
FIG. 1 is a schematic diagram showing a throttle valve actuating device and a control system for the throttle valve actuating device, according to a first embodiment of the present invention.

FIG. 1 schematically shows a configuration of a throttle valve control system according to a first embodiment of the present invention. An internal combustion engine (hereinafter referred to as "engine") 1 has an intake passage 2 with a throttle valve 3 disposed therein. The throttle valve 3 is provided with a return spring 4 as a first biasing means for biasing the throttle valve 3 in a closing direction, and a default spring 5 as a second biasing means for biasing the throttle valve 3 in an opening direction. The throttle valve 3 can be actuated by a motor 6 as an actuating means through gears (not shown). When the actuating force from the motor 6 is not applied to the throttle valve 3, an opening TH of the throttle valve 3 is maintained at a default opening THDEF (for example, 11 degrees) where the biasing force of the return spring 4 and the biasing force of the default spring 5 are in equilibrium.

The motor 6 is connected to an electronic control unit (hereinafter referred to as "ECU") 7. The operation of the motor 6 is controlled by the ECU 7. The throttle valve 3 is associated with a throttle valve opening sensor 8 for detecting the throttle valve opening TH. A detected signal from the throttle valve opening sensor 8 is supplied to the ECU 7.

Further, the ECU 7 is connected to an acceleration sensor 9 for detecting a depression amount ACC of an accelerator pedal to detect an output demanded by the driver of the vehicle on which the engine 1 is mounted. A detected signal from the acceleration sensor 9 is supplied to the ECU 7.

The ECU 7 has an input circuit, an A/D converter, a central processing unit (CPU), a memory circuit, and an output circuit. The input circuit is supplied with detected signals from the throttle valve opening sensor 8 and the acceleration sensor 9. The A/D converter converts input signals into digital signals. The CPU carries out various process operations. The memory circuit has a ROM (read only memory) for storing processes executed by the CPU, and maps and tables that are referred to in the processes, a RAM for storing results of executing processes by the CPU. The output circuit supplies an energizing current to the motor 6. The ECU 7 determines a target opening THR of the throttle valve 3 according to the depression amount ACC of the accelerator pedal, determines a control quantity DUT for the motor 6 in order to make the detected throttle valve opening TH coincide with the target opening THR, and supplies an electric signal according to the control quantity DUT to the motor 6.

The control quantity DUT indicates a polarity and a duty ratio of the electric signal supplied to the motor 6. Therefore, the control quantity DUT is also referred to as "duty ratio". When the throttle valve opening TH is greater than the default opening THDEF, the control quantity DUT takes a positive value so that the motor 6 generates an actuating force for actuating the throttle valve 3 in the opening direction. When the throttle valve opening TH is less than the default opening THDEF, the control quantity DUT takes a negative value so that the motor 6 generates an actuating force for actuating the throttle valve 3 in the closing direction.

In the present embodiment, a throttle valve actuating device 10 that includes the throttle valve 3, the return spring 4, the default spring 5, and the motor 6 is a controlled object. An input to be applied to the controlled object is the duty ratio DUT of the electric signal applied to the motor 6. An output from the controlled object is the throttle valve opening TH detected by the throttle valve opening sensor 8.

A model defined by the equation (1) shown below is set as a controlled object model according to the frequency response characteristics of the throttle valve actuating device 10. It has been confirmed that the frequency response characteristics of the model can be approximated to the characteristics of the throttle valve actuating device 10.

$$DTH(n+1)=a1 \times DTH(n)+a2 \times DTH(n-1)+b1 \times DUT(n-d)+c1 \quad (1)$$

where "n" is a parameter representing a discrete sampling time or a discrete control time which is digitized with an identification period $\Delta TID$, and $DTH(n)$ is a throttle valve opening deviation amount defined by the equation (2) shown below. Further, a1, a2, b1, and c1 are model parameters determining the characteristics of the controlled object model, and d is a dead time. The dead time d is a delay between the input and output of the controlled object model.

$$DTH(n)=TH(n)-THDEF \quad (2)$$

where TH is a detected throttle valve opening, and THDEF is the default opening.

In this embodiment, "n" which is indicative of a sampling time or a control time corresponding to the identification period $\Delta TID$ is used as a discrete time for defining the controlled object model. The time interval of calculating and outputting the control input DUT is set to a control period $\Delta TCTL$ which is shorter than the identification period $\Delta TID$. The control period TCTL is set to, for example, one fifth of the identification period $\Delta TID$. The discrete time corresponding to the control period $\Delta TCTL$ will be indicated by "k" in the following description. The reason why the identification period $\Delta TID$ is set to a period which is longer than the control period $\Delta TCTL$ is as follows: if the model parameters are identified based on data sampled at intervals of a relatively short sampling period compared with the change rate (change period) of the output of the controlled object model, then the accuracy of the identified model parameters becomes greatly lowered, and the performance of adapting to variations and aging of the characteristics of the controlled object becomes insufficient.

For reducing the amount of calculations, it is effective to define a controlled object model by the equation (1a) shown below where the dead time d is set to "0". A modeling error (a difference between the characteristics of the controlled object model and the characteristics of an actual controlled object (plant)) caused by setting the dead time d to "0", is compensated by employing a sliding mode controller having robustness. "Robustness" of a control system means that control performance or control stability of the control system is not easily deteriorated even when the characteristics of the controlled object or disturbances change largely compared with an ordinary condition.

$$DTH(n+1)=a1 \times DTH(n)+a2 \times DTH(n-1)+b1 \times DUTAV(n)+c1 \quad (1a)$$

In the equation (1a), a filtered control quantity DUTAV is used instead of the control quantity DUT. The filtered control quantity DUTAV is obtained by a filtering process that attenuates high frequency components of the control quantity DUT, more specifically, by a moving-averaging calculation of the control quantity DUT. As described above, the control period $\Delta TCTL$ is shorter than the identification period $\Delta TID$ which correspond to the discrete time "n" used for defining the controlled object model, and the control quantity DUT varies at intervals of the control period $\Delta TCTL$. However, if the control quantity DUT which varies at intervals of the control period $\Delta TCTL$ is used as it is, the identifying error of the model parameters sometimes become greater. Therefore, in this embodiment, the filtered control quantity DUTAV is used for defining the controlled object model. This makes it possible to suppress variations in model parameters which occur at intervals of a short period corresponding to the control period $\Delta TCTL$, and to improve controllability of the throttle valve opening.

Further, in the equation (1a), the model parameter c1 which is irrelevant to the input and output of the controlled object, is employed in addition to the model parameters a1 and a2 which are relevant to the throttle valve opening deviation amount DTH which is the output of the controlled object, and the model parameter b1 which is relevant to the input duty ratio (control quantity) DUT which is the input of the controlled object. In equation (1a), the model parameter b1 is multiplied not by the control quantity DUT, but by the filtered control quantity DUTAV. The model parameter c1 is a parameter representing a deviation amount of the default opening THDEF and disturbance applied to the throttle valve actuating device 10. In other words, the default opening deviation amount and the disturbance can be identified by identifying the model parameter c1 simultaneously with the model parameters a1, a2, and b1 by a model parameter identifier described below.

FIG. 2 is a functional block diagram of the throttle valve control system which is realized by the ECU 7. The throttle valve control system includes an adaptive sliding mode controller 21, a model parameter identifier 22, a model parameter scheduler 25, a target opening setting unit 24 for setting a target opening THR for the throttle valve 3 according to the accelerator pedal depression amount ACC, subtractors 26 and 27, and a filter 28 that performs a filtering process of the control quantity DUT.

The adaptive sliding mode controller 21 calculates a duty ratio DUT according to an adaptive sliding mode control in order to make the detected throttle valve opening TH coincide with the target opening THR, and outputs the calculated duty ratio DUT.

By using the adaptive sliding mode controller 21, it is possible to change (specify) the response characteristics of the throttle valve opening TH to the target opening THR, using a specific parameter (a switching function setting parameter VPOLE to be described later). As a result, an optimum response characteristic can be specified according to the throttle valve opening TH. For example, it is possible to avoid shocks at the time the throttle valve 3 moves from an open position to a fully closed position, i.e., at the time the throttle valve 3 collides with a stopper for stopping the throttle valve 3 at the fully closed position. It is also possible to make the engine response corresponding to the operation of the accelerator pedal variable. Further, the sliding mode control makes it possible to obtain a good stability against errors of the model parameters.

The model parameter identifier 22 calculates a corrected model parameter vector θL (θL$^T$=[a1, a2, b1, c1]) and supplies the calculated corrected model parameter vector θL to the adaptive sliding mode controller 21. More specifically, the model parameter identifier 22 calculates a model parameter vector θ based on the throttle valve opening TH and the filtered control quantity DUTAV. The model parameter identifier 22 then carries out a first limit process, an oversampling and moving-averaging process, and a second limit process of the model parameter vector θ to calculate a corrected model parameter vector θL. The corrected model parameter vector θL is supplied to the adaptive sliding mode controller 21. In this manner, the model parameters a1, a2, and b1 which are optimum for making the throttle valve opening TH follow up the target opening THR are obtained., and also the model parameter c1 indicative of disturbance and a deviation amount of the default opening THDEF is obtained. The first limit process, the oversampling and moving-averaging process, and the second limit process will be described later.

By using the model parameter identifier 22 for identifying the model parameters on a real-time basis, adaptation to changes in engine operating conditions, compensation for hardware characteristics variations, compensation for power supply voltage fluctuations, and adaptation to aging-dependent changes of hardware characteristics are possible.

The model parameter scheduler 25 calculates a reference model parameter vector θbase (θbase$^T$=[a1base, a2base, b1base, c1base]) according to a target value DTHR which is defined as a deviation amount between a target opening THR(n) and the default opening THDEF by the following equation (3), the calculated reference model parameter vector θbase is supplied to the model parameter identifier 22.

The calculation of the reference model parameter vector θbase is executed at intervals of the identification period ΔTID.

$$DTHR(n) = THR(n) - THDEF \qquad (3)$$

The subtractor 26 calculates a deviation amount between the default opening THDEF and the throttle valve opening TH as the throttle valve opening deviation amount DTH, and the subtractor 27 calculates a deviation amount between the default opening THDEF and the target opening THR as the target value DTHR (see the equations (2) and (3)).

The filter 28 performs the filtering process that attenuates high frequency components of the control quantity DUT. More specifically, the filtered control quantity DUTAV is calculated by moving-averaging the control quantity DUT, and input to the model parameter identifier 22.

Principles of operation of the adaptive sliding mode controller 21 will be described below.

If a deviation e(n) between the throttle valve opening deviation amount DTH and the target value DTHR is defined by the following equation (4), then a switching function value σ(n) of the adaptive sliding mode controller is set by the following equation (5).

$$e(n) = DTH(n) - DTHR(n) \qquad (4)$$

$$\sigma(n) = e(n) + VPOLE \times e(n-1) \qquad (5)$$
$$= (DTH(n) - DTHR(n)) +$$
$$VPOLE \times (DTH(n-1) - DTHR(n-1))$$

where VPOLE is a switching function setting parameter that is set to a value greater than "−1" and less than "1".

On a phase plane defined by a vertical axis representing a deviation e(n) and a horizontal axis representing a preceding deviation e(n−1), a pair of the deviation e(n) and the preceding deviation e(n−1) satisfying the equation of "σ(n)=0" represents a straight line. The straight line is generally referred to as a switching straight line. A sliding mode control is a control contemplating the behavior of the deviation e(n) on the switching straight line. The sliding mode control is carried out so that the switching function value σ(n) becomes "0", i.e., the pair of the deviation e(n) and the preceding deviation e(n−1) exists on the switching straight line on the phase plane, to thereby achieve a robust control against disturbance and the modeling error. As a result, the throttle valve opening deviation amount DTH is controlled with good robustness to follow up the target value DTHR.

By changing the value of the switching function setting parameter VPOLE in the equation (5), it is possible to change a damping characteristic of the deviation e(n), i.e., the follow-up characteristic of the throttle valve opening deviation amount DTH to follow up the target value DTHR. Specifically, if VPOLE equals "−1", then the throttle valve opening deviation amount DTH completely fails to follow up the target value DTHR. As the absolute value of the switching function setting parameter VPOLE is reduced, the speed at which the throttle valve opening deviation amount DTH follows up the target value DTHR increases. Since the sliding mode controller is capable of specifying the damping characteristic of the deviation e(n) as a desired characteristic, the sliding mode controller is referred to as a response-specifying controller.

According to the sliding mode control, the converging speed can easily be changed by changing the switching function setting parameter VPOLE. Therefore, in the present embodiment, the switching function setting parameter VPOLE is set according to the throttle valve opening deviation amount DTH to obtain a response characteristic suitable for the operating condition of the throttle valve 3.

As described above, according to the sliding mode control, the deviation e(n) is converged to "0" at an indicated speed and robustly against disturbance and the modeling error by constraining the pair of the deviation e(n) and the preceding deviation e(n−1) on the switching straight line (the pair of e(n) and e(n−1) will be referred to as "deviation state quantity"). Therefore, in the sliding mode control, it is important how to place the deviation state quantity onto the switching straight line and constrain the deviation state quantity on the switching straight line.

From the above standpoint, an input DUT(k) (also indicated as Usl(k)) to the controlled object (an output of the controller) is basically calculated as a sum of an equivalent control input Ueq(k), a reaching law input Urch(k), an adaptive law input Uadp(k), a nonlinear input Unl(k), and a damping input Udamp(k) by the following equation (6).

$$DUT(k) = Usl(k) \quad (6)$$
$$= Ueq(k) + Urch(k) + Uadp(k) + Unl(k) + Udamp(k)$$

The equivalent control input Ueq(k) is an input for constraining the deviation state quantity on the switching straight line. The reaching law input Urch(k) is an input for placing the deviation state quantity onto the switching straight line. The adaptive law input Uadp(k) is an input for placing the deviation state quantity onto the switching straight line while reducing the modeling error and the effect of disturbance.

The nonlinear input Unl(k) is an input for suppressing a nonlinear modeling error due to backlash of speed reduction gears for actuating the valve body of the throttle valve 3, and placing the deviation state quantity onto the switching straight line. The damping input Udamp is an input for preventing the throttle valve opening deviation amount DTH from overshooting with respect to the target value DTHR.

Methods of calculating these inputs Ueq(k), Urch(k), Uadp(k), Unl(k), and Udamp(k) will be described below.

Since the equivalent control input Ueq(k) is an input for constraining the deviation state quantity on the switching straight line, a condition to be satisfied is given by the following equation (7).

$$\sigma(n) = \sigma(n+1) \quad (7)$$

Using the equations (1), (4), and (5), the duty ratio DUT(n) satisfying the equation (7) is determined by the equation (8) shown below. The duty ratio DUT(n) calculated with the equation (8) represents the equivalent control input Ueq(n).

$$DUT(n) = \frac{1}{b1}\{(1 - a1 - VPOLE)DTH(n) + \quad (8)$$
$$(VPOLE - a2)DTH(n-1) - c1 + DTHR(n+1) +$$
$$(VPOLE - 1)DTHR(n) - VPOLE \times DTHR(n-1)\}$$
$$= Ueq(n)$$

Since it is actually difficult to obtain a future value DTHR(n+1) of the target value, the equivalent control input Ueq(n) is calculated by the following equation (8a) from which the term relative to the target value DTHR is removed. Further, in the equation (8a), the discrete time "n" is replaced with the discrete time "k".

$$Ueq(k) = \frac{1}{b1}\{(1 - a1 - VPOLE)DTH(k) + \quad (8a)$$
$$(VPOLE - a2)DTH(k - k0) - c1\}$$

where k0 represents a ratio of the identification period ΔTID and the control period ΔTCTL (ΔTID/ΔTCTL, e.g., "5").

The reaching law input Urch(n) and the adaptive law input Uadp(n) are defined by the respective equations (9) and (10) shown below.

$$Urch(k) = \frac{-F}{b1}\sigma(k) \quad (9)$$

$$Uadp(k) = Uadp(k-1) - \frac{G}{b1}\Delta TCTL \times \sigma(k) \quad (10)$$

where F and G represent respectively a reaching law control gain and an adaptive law control gain, which are set so that the deviation state quantity can stably be placed onto the switching straight line. Further, σ(k) corresponds to the switching function value σ(n), and is expressed by using the discrete time "k" instead of "n". The switching function value σ(k) is defined by the equation (5a) shown below.

$$\sigma(k) = e(k) + VPOLE \times e(k - k0) \quad (5a)$$
$$= DTH(k) - DTHR(k) + VPOLE \times (DTH(k - k0) -$$
$$DTHR(k - k0))$$

The nonlinear input Unl is calculated by the equation (11) shown below.

$$Unl(k) = -Knl \times sgn(\sigma(k))b1 \quad (11)$$

where sgn(σ(k)) represents a sign function whose value equals "1" when σ(k) has a positive value, and equals "−1" when σ(k) has a negative value. Knl is a nonlinear input gain which is set according to the throttle valve opening deviation amount DTH.

By using the nonlinear input Unl(k), the convergence of the steady deviation is prevented from being delayed, when the target value DTHR is slightly changing.

The damping input Udamp is calculated by the equation (13) shown below.

$$Udamp = -Kdamp(DTH(k) - DTH(k-1))/b1 \quad (13)$$

where Kdamp is a damping control gain which is calculated by the equation (14) shown below.

$$Kdamp = Kdampbs \times Kkdamp \quad (14)$$

where Kdampbs is a basic value which is set according to the throttle valve opening deviation amount DTH. Kkdamp is a correction coefficient which is calculated according to a moving average value DDTHRAV of amounts of change in the target value DTHR.

The moving average value DDTHRAV is calculated by the following equation (15):

$$DDTHRAV(k) = \sum_{i=0}^{iAV}(DTHR(k-i) - DTHR(k-i-1))/(iAV+1) \quad (15)$$

where iAV represents a number that is set to "50", for example.

As described above, the equivalent control input Ueq(k), the reaching law input Urch(k), the adaptive law input Uadp(k), the nonlinear input Unl(k), and the damping input Udamp(k) are calculated, and the duty ratio DUT(k) is calculated as a sum of those inputs.

Principles of operation of the model parameter identifier 22 will be described below.

The model parameter identifier 22 calculates a model parameter vector of the controlled object model, based on the filtered control quantity DUTAV corresponding to the input (DUT(n)) of the controlled object, and the output (TH(n)) of the controlled object, as described above. Specifically, the model parameter identifier 22 calculates a model parameter vector θ(n) according to a sequential identifying algorithm (generalized sequential method-of-least-squares algorithm) represented by the following equation (16).

$$\theta(n)=\theta(n-1)+KP(n)ide(n) \quad (16)$$

$$\theta(n)^T=[a1'', a2'', b1'', c1''] \quad (17)$$

where a1", a2", b1", and c1" represent model parameters before a first limit process, described later, is carried out, ide(n) represents an identifying error defined by the equations (18), (19), and (20) shown below, where DTHHAT(n) represents an estimated value of the throttle valve opening deviation amount DTH(n) (hereinafter referred to as "estimated throttle valve opening deviation amount") which is calculated using the latest model parameter vector θ(n-1), and KP(n) represents a gain coefficient vector defined by the equation (21) shown below. In the equation (21), P(n) represents a quartic square matrix calculated by the equation (22) shown below.

$$ide(n)=DTH(n)-DTHHAT(n) \quad (18)$$

$$DTHHAT(n)=\theta(n-1)^T\zeta(n) \quad (19)$$

$$\zeta(n)^T=[DTH(n-1), DTH(n-2), DUTAV(n-1), 1] \quad (20)$$

$$KP(n) = \frac{P(n)\zeta(n)}{1+\zeta^T(n)P(n)\zeta(n)} \quad (21)$$

$$P(n+1) = \frac{1}{\lambda_1}\left(E - \frac{\lambda_2 P(n)\zeta(n)\zeta^T(n)}{\lambda_1+\lambda_2\zeta^T(n)P(n)\zeta(n)}\right)P(n) \quad (22)$$

E is an Unit Matrix

The filtered control quantity DUTAV(n-1) in the equation (20) is calculated as follows: Firstly, the filtered control quantity DUTAV(k) is calculated by the following equation (23) at intervals of the control period ΔTCTL, and secondly, the filtered control quantity DUTAV(n-1) is given by the following equation (24).

$$DUTAV(k) = \sum_{j=0}^{jAV} DUTAV(k-j)/(jAV+1) \quad (23)$$

$$DUTAV(n-1)=DUTAV(k-k0) \quad (24)$$

where (jAV+1) in the equation (23) is a number of data subjected to the moving-averaging calculation and the parameter jAV is set to "4", for example.

In accordance with the setting of coefficients λ1 and λ2 in the equation (22), the identifying algorithm from the equations (16) through (22) becomes one of the following four identifying algorithm:

| | |
|---|---|
| λ1 = 1, λ2 = 0 | Fixed gain algorithm |
| λ1 = 1, λ2 = 1 | Method-of-least-squares algorithm |
| λ1 = 1, λ2 = λ | Degressive gain algorithm (λ is a given value other than 0 or 1) |
| λ1 = λ, λ2 = 1 | Weighted Method-of-least-squares algorithm (λ is a given value other than 0 or 1) |

If the fixed gain algorithm is used to reduce the amount of calculations, then the equation (21) is simplified into the following equation (21a) where P represents a square matrix with constants as diagonal elements.

$$KP(n) = \frac{P\zeta(n)}{1+\zeta^T(n)P\zeta(n)} \quad (21a)$$

There are situations where model parameters calculated from the equations (16) through (20), and (21a) gradually shifts from desired values. Specifically, if a residual identifying error caused by nonlinear characteristics such as friction characteristics of the throttle valve exists after the model parameters have been converged to a certain extent, or if a disturbance whose average value is not zero is steadily applied, then the residual identifying errors are accumulated, causing a drift in the model parameter. To prevent such a drift of the model parameters, the model parameter vector θ(n) is calculated by the following equation (16a) instead of the equation (16).

$$\theta(n) = \theta(0) + DELTA^{n-1} \times KP(1)ide(1) + \quad (16a)$$
$$DELTA^{n-2} \times KP(2)ide(2) + \ldots +$$
$$DELTA \times KP(n-1)ide(n-1) + KP(n)ide(n)$$

where DELTA represents a forgetting coefficient matrix in which the forgetting coefficient δi (i=1 through 3) and "1"

are diagonal elements and other elements are all "0", as shown by the following equation (25).

$$DELTA = \begin{bmatrix} \delta 1 & 0 & 0 & 0 \\ 0 & \delta 2 & 0 & 0 \\ 0 & 0 & \delta 3 & 0 \\ 0 & 0 & 0 & 1 \end{bmatrix} \quad (25)$$

The forgetting coefficient δi is set to a value between "0" and "1" (0<δi<1) and has a function to gradually reduce the effect of past identifying errors. In the equation (25), the coefficient which is relevant to the calculation of the model parameter c1" is set to "1", holding the effect of past values. By setting one of the diagonal elements of the forgetting coefficient matrix DELTA, i.e., the coefficient which is relevant to the calculation of the model parameter c1", to "1", it is possible to prevent a steady deviation between the target value DTHR and the throttle valve opening deviation amount DTH. The model parameters are prevented from drifting by setting other elements δ 1, δ 2, and δ 3 of the forgetting coefficient matrix DELTA to a value which is greater than "0" and less than "1".

When the equation (16a) is rewritten into a recursive form, the following equations (16b) and (16c) are obtained. A process of calculating the model parameter vector θ(n) using the equations (16b) and (16c) rather than the equation (16) is hereinafter referred to as "δ correcting method", and dθ(n) defined by the equation (16c) is referred to as "updating vector".

$$\theta(n) = \theta(0) + d\theta(n) \quad (16b)$$

$$d\theta(n) = DELTA \cdot d\theta(n-1) + KP(n)ide(n) \quad (16c)$$

According to an algorithm using the δ correcting method, in addition to the drift preventing effect, a model parameter stabilizing effect can be obtained. Specifically, an initial vector θ(0) is maintained at all times, and values which can be taken by the elements of the updating vector dθ(n) are limited by the effect of the forgetting coefficient matrix DELTA. Therefore, the model parameters can be stabilized in the vicinity of their initial values.

Furthermore, since model parameters are calculated while adjusting the updating vector dθ(n) according to identifying process based on the input and output data of the actual controlled object, it is possible to calculate model parameters that match the actual controlled object.

It is preferable to calculate the model parameter vector θ(n) from the following equation (16d) which uses a reference model parameter vector θbase instead of the initial vector θ(0) in the equation (16b).

$$\theta(n) = \theta base + d\theta(n) \quad (16d)$$

The reference model parameter vector θbase is set according to the target value DTHR by the model parameter scheduler 25. Consequently, the reference model parameter vector θbase can be adapted to changes in the dynamic characteristics which correspond to changes in the throttle valve opening TH.

Further, in the present embodiment, the identifying error ide(n) is subjected to a low-pass filtering. Specifically, when model parameters are identified by the model parameter identifier 22 with respect to the controlled object which has low-pass characteristics (characteristics of attenuating high-frequency components), the identified model parameters are largely affected by the high-frequency-rejection characteristics, so that the gain of the controlled object model becomes lower than actual characteristics in a low-frequency range. As a result, the sliding mode controller 21 excessively corrects the control input.

Therefore, according to the low-pass filtering, the frequency characteristics of the controlled object are changed to coincide with the actual frequency characteristics, or the low frequency gain of the controlled object model is corrected to a level which is slightly higher than the actual gain. Accordingly, it is possible to prevent the control input from being excessively corrected by the sliding mode controller 21, to thereby improve the robustness of the control system and further stabilize the control system.

The low-pass filtering is carried out by storing past values ide(n−i) of the identifying error (e.g., 10 past values for i=1 through 10) in a ring buffer, multiplying the past values by weighting coefficients, and adding the products of the past values and the weighting coefficients.

When the identifying error which has been subjected to the low-pass filtering is represented by idef(n) as shown in the equation (30) shown below, then the updating vector dθ(n) is calculated from the following equation (16e) instead of the equation (16c).

$$idef(n) = LF(ide(n)) \quad (30)$$

$$d\theta(n) = DELTA \times d\theta(n-1) + KP(n)idef(n) \quad (16e)$$

As described above, the adaptive sliding mode controller 21, the model parameter identifier 22, and the model parameter scheduler 25 is constructed based on the model which is modeled with a sampling period (control period) that is equal to the identification period ΔTID. Accordingly, the model parameter identifier 22 identifies the model parameter vector θ at intervals of the identification period ΔTID, and the model parameter scheduler 25 calculates the reference model parameter vector θbase at intervals of the identification period ΔTID. It should be noted that the adaptive sliding mode controller calculates a control input at intervals of the control period ΔTCTL.

When employing the above calculation timings, the period of updating model parameters which are used to calculate the control input DUT becomes longer than the period of updating the control input DUT by the controller 21. As a result, the period of updating model parameters affects the control input DUT, which may possibly cause resonance in the control system.

Therefore, in the present embodiment, such resonance in the control system is prevented by sampling (oversampling) model parameters which are identified at intervals of the identification period ΔTID, at intervals of the control period ΔTCTL, storing the sampled data in a ring buffer, and using values obtained by effecting a moving-averaging process on the data stored in the ring buffer as model parameters for the control.

The elements a1", a2", b1", and c1" of the model parameter vector θ(n) calculated by the equation (16d) are subjected to a limit process described below in order to improve robustness of the control system.

Figure 3A:
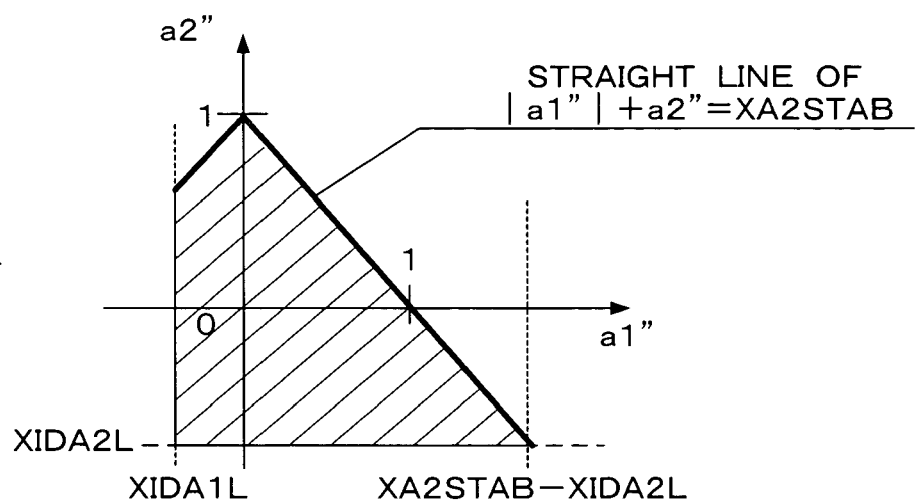
FIGS. 3A and 3B are diagrams illustrating a limit process of model parameters (a1", a2")
Figure 3B:
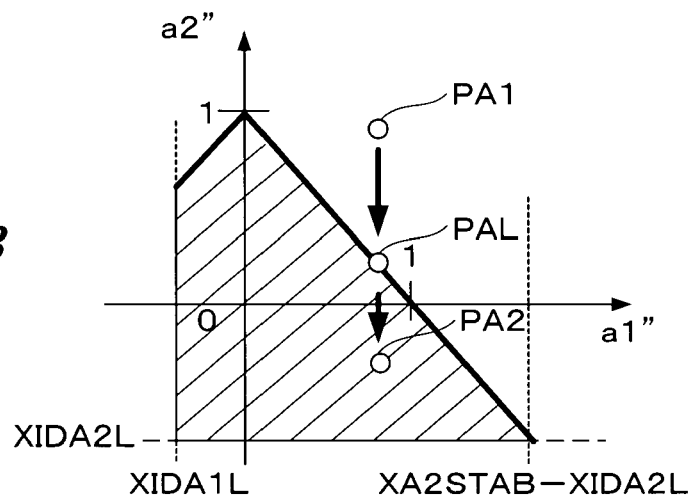

FIGS. 3A and 3B are diagrams illustrating a limit process of the model parameters a1" and a2". FIGS. 3A and 3B show a plane defined by the horizontal axis of the model parameter a1" and the vertical axis of the model parameter a2". If the model parameters a1" and a2" are located outside a stable region which is indicated as a hatched region, then a limit process is performed to change them to values corresponding to an outer edge of the stable region.

If the model parameter b1" falls outside a range between an upper limit value XIDB1H and a lower limit value XIDB1L, then a limit process is performed to change the model parameter b1" to the upper limit value XIDB1H or the lower limit value XIDB1L. If the model parameter c1" falls outside of a range between an upper limit value XIDC1H and a lower limit value XIDC1L, then a limit process is performed to change the model parameter c1" to the upper limit value XIDC1H or the lower limit value XIDC1L.

A set of the above limit processes (first limit process) is expressed by the equation (31) shown below. θ*(n) represents the limited model parameter vector, whose elements are expressed by the equation (32) shown below.

$$\theta^*(n) = LMT(\theta(n)) \tag{31}$$

$$\theta^*(n)^T = [a1^*(n), a2^*(n), b1^*(n), c1^*(n)] \tag{32}$$

In the control system disclosed in International Patent Publication No. WO 02/086630, the preceding updating vector dθ(n−1) which is used to calculate the updating vector dθ(n) from the equation (16e) and the preceding model parameter vector θ(n−1) which is used to calculate the estimated throttle valve opening deviation amount DTHHAT(k) includes model parameters that are not subjected to the limit process. In the present embodiment, a vector calculated by the equation (33) shown below is used as the preceding updating vector dθ(n−1), and a limited model parameter vector θ*(n−1) is used as the preceding model parameter vector which is used to calculate the estimated throttle valve opening deviation amount DTHHAT(k), as shown by the following equation (19a).

$$d\theta(n-1) = \theta^*(n-1) - \theta base(n-1) \tag{33}$$

$$DTHHAT(n) = \theta^*(n-1)^T \zeta(n) \tag{19a}$$

The reasons for the above process are described below.

If a point corresponding to coordinates determined by the model parameters a1" and a2" (hereinafter referred to as "model parameter coordinates") is located at a point PA1 shown in FIG. 3B, then a limit process is performed to move a point corresponding to the model parameter coordinates to a point PAL positioned on an outer edge of the stable region. If the throttle valve opening deviation amount DTH changes and a point corresponding to the model parameter coordinates to which the model parameters a1" and a2" are to be converged, changes to a point PA2, then the movement from the point PA1 to the point PA2 is slower than the movement from the point PAL to the point PA2. That is, when the control process carried out by the adaptive sliding mode controller 21 is adapted to the dynamic characteristics of the controlled object, a dead time is produced, which may lower the controllability.

Therefore, in the present embodiment, the limited model parameter vector θ*(n−1) is applied to the equations (33) and (19a) to calculate the present model parameter vector θ(n).

A model parameter vector θ*(k) obtained at time k by oversampling the model parameter vector θ*(n) after the first limit process is expressed by the following equation (32a).

$$\theta^*(k)^T = [a1^*(k), a2^*(k), b1^*(k), c1^*(k)] \tag{32a}$$

When a model parameter vector θ'(k) obtained by moving-averaging of the oversampled model parameter vector θ*(k) is expressed by the following equation (32b), then elements a1'(k), a2'(k), b1'(k), and c1'(k) of the model parameter vector θ'(k) are calculated by the following equations (34) through (37).

$$\theta'(k)^T = [a1'(k), a2'(k), b1'(k), c1'(k)] \tag{32b}$$

$$a1'(k) = \sum_{i=0}^{m} a1*(k-i)/(m+1) \tag{34}$$

$$a2'(k) = \sum_{i=0}^{m} a2*(k-i)/(m+1) \tag{35}$$

$$b1'(k) = \sum_{i=0}^{m} b1*(k-i)/(m+1) \tag{36}$$

$$c1'(k) = \sum_{i=0}^{m} c1*(k-i)/(m+1) \tag{37}$$

where (m+1) represents the number of data which are subjected to the moving-averaging, and "m" is set to "4", for example.

Then, as shown by the equation (38) described below, the model parameter vector θ'(k) is subjected to a limit process (second limit process) similar to the above limit process, thus calculating a corrected model parameter vector θL(k) expressed by the equation (39) shown below, because the model parameter a1' and/or the model parameter a2' may change so that a point corresponding to the model parameters a1' and a2' moves out of the stable region shown in FIGS. 3A and 3B due to the moving-averaging calculations. The model parameters b1' and c1' are not actually limited because they do not change out of the limited range by the moving-averaging calculations.

$$\theta L(k) = LMT(\theta'(k)) \tag{38}$$

$$\theta L(k)^T = [a1, a2, b1, c1] \tag{39}$$

Processes executed by the CPU of the ECU 7 for realizing the above functions of the controller 21, the model parameter identifier 22, and the model parameter scheduler 25 will be described below.

Figure 4:
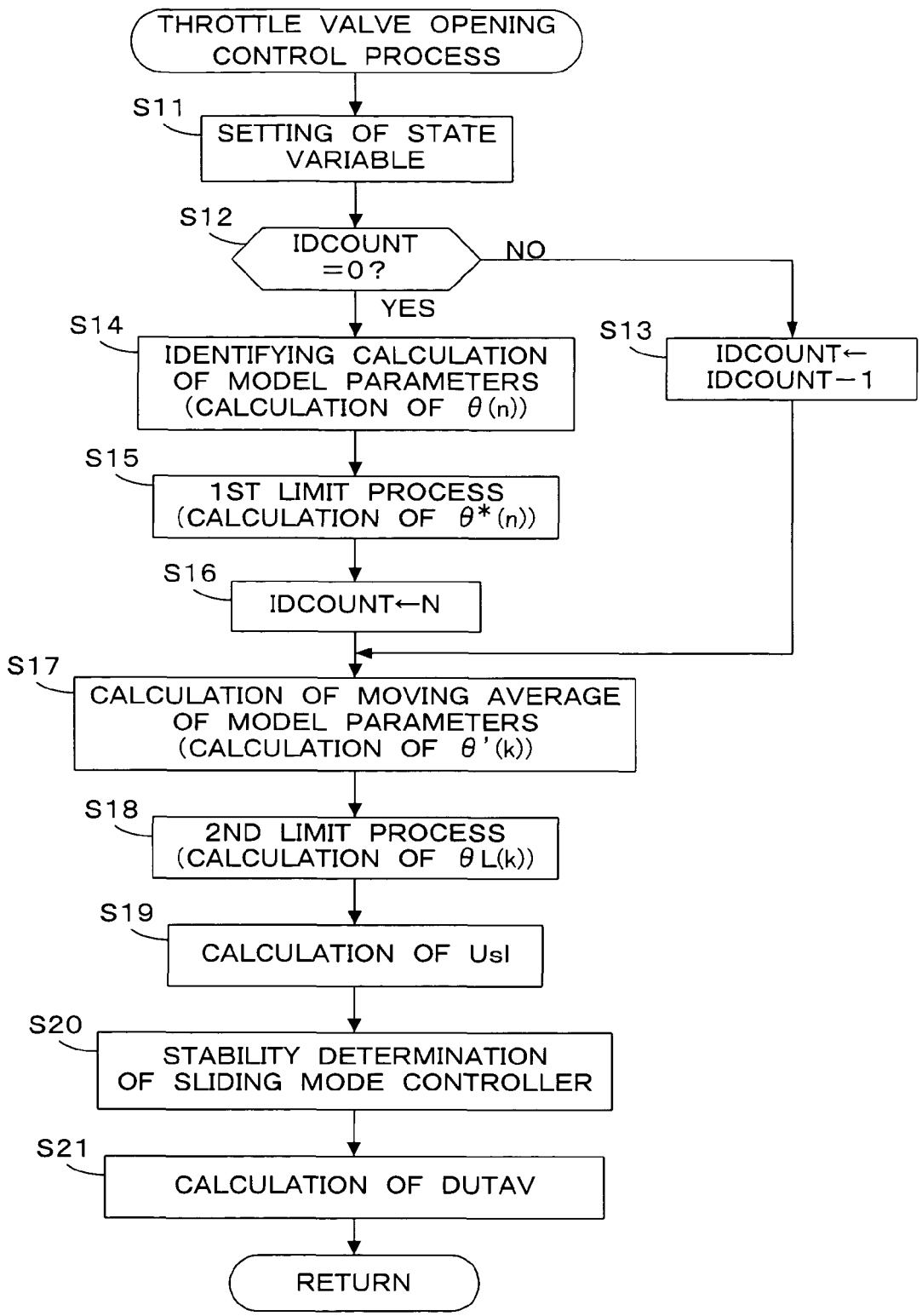
FIG. 4 is a flowchart showing a throttle valve opening control process.

FIG. 4 is a flowchart showing a throttle valve opening control process, which is executed by the CPU of the ECU 7 at intervals of the control period ΔTCTL, e.g., 2 msec.

Figure 5:
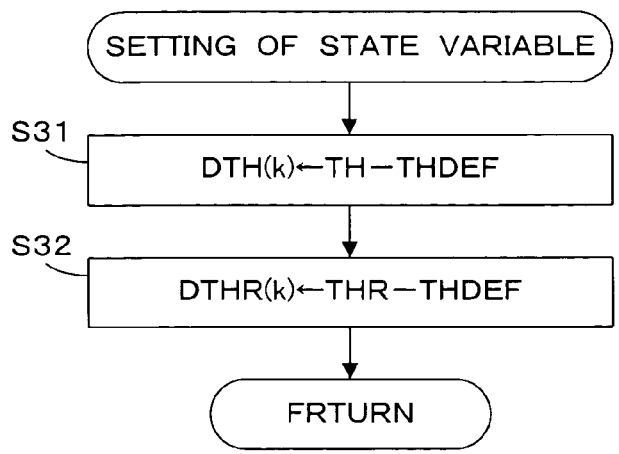
FIG. 5 is a flowchart showing a process of setting a state variable executed in the process shown in FIG. 4.

In step S11, a process of setting a state variable shown in FIG. 5 is carried out. Specifically, calculations of the equations (2) and (3) are carried out to determine the throttle valve opening deviation amount DTH(k) and the target value DTHR(k) in steps S31 and S32 in FIG. 5. The symbol (k) or (n) representing a current value may occasionally be omitted.

Figure 6:
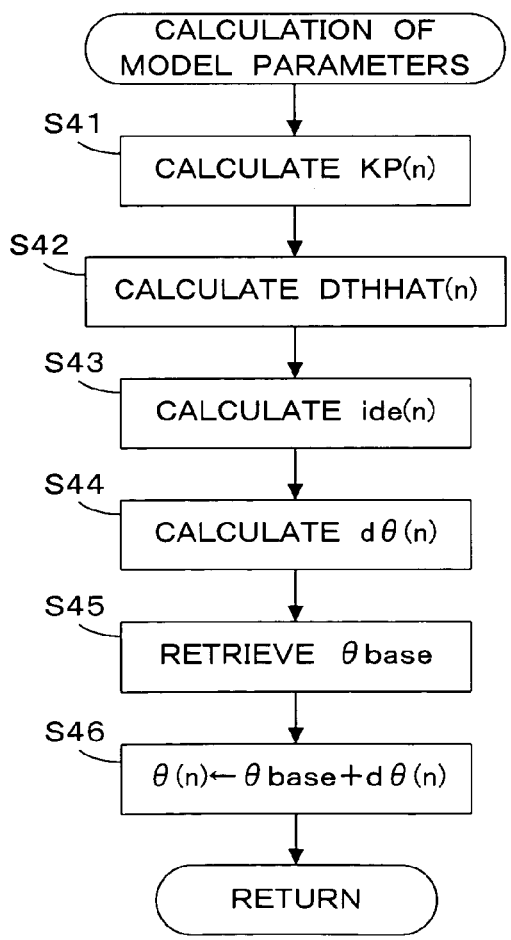
FIG. 6 is a flowchart showing a process of identifying model parameters executed in the process shown in FIG. 4.
Figure 9:
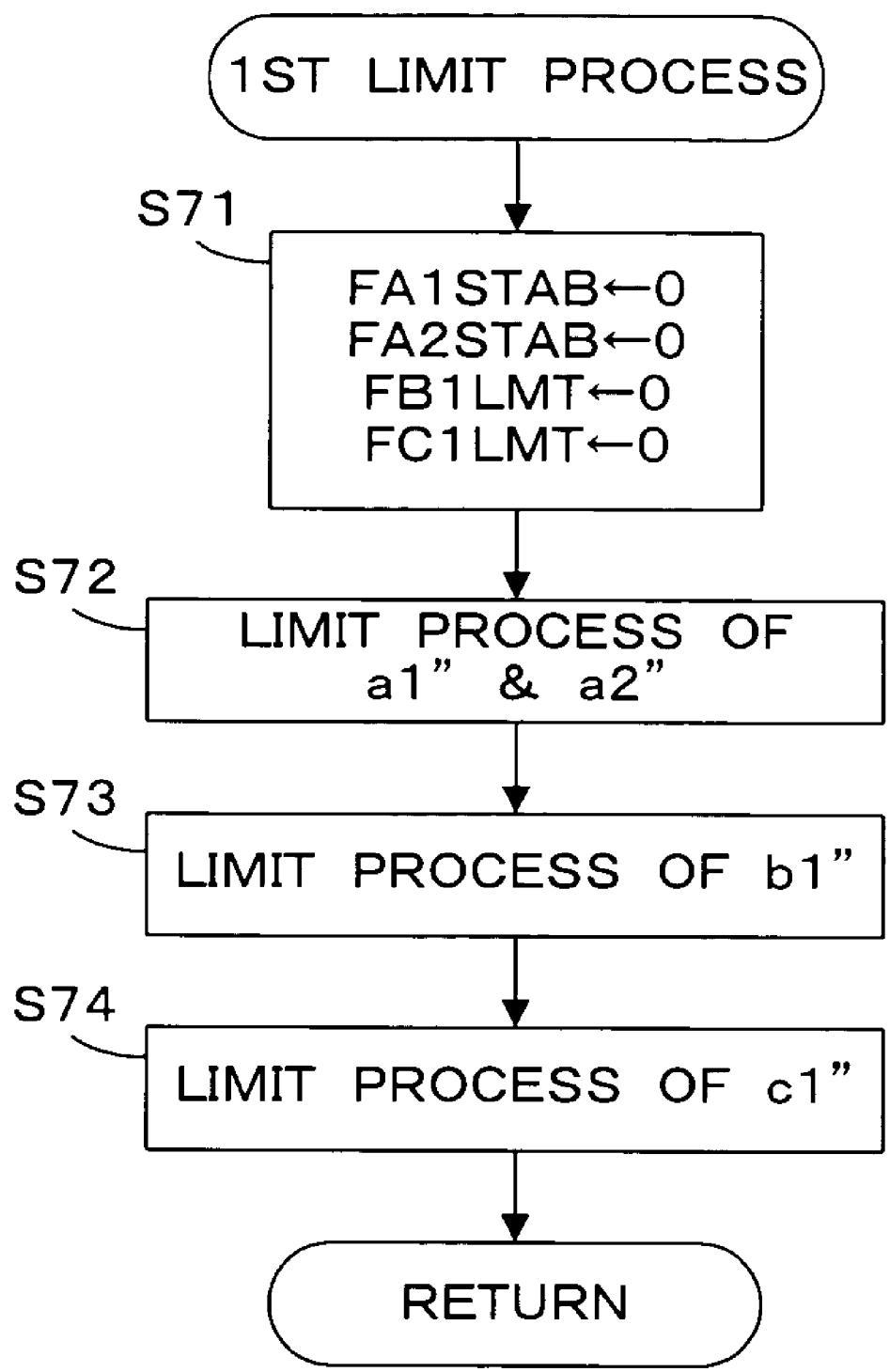
FIG. 9 is a flowchart showing a first limit process executed in the process shown in FIG. 4.

In step S12, it is determined whether or not the value of a counter IDCOUNT is "0". Since the counter IDCOUNT is initially set to "0", the process proceeds from step S12 to step S14, in which a process of identifying a model parameter shown in FIG. 6 is carried out, i.e., a process of calculating a model parameter vector θ(n) is carried out. Then, a first limit process shown in FIG. 9 is carried out to calculate a model parameter vector θ*(n) in step S15. Specifically, the limit process of the model parameter vector θ(n) is executed to calculate the model parameter vector θ*(n). Elements a1*(n), a2*(n), b1*(n), and c1*(n) of the calculated model parameter vector θ*(n) are stored in a ring buffer for the oversampling process. Specifically, a predetermined number N of each elements, i.e., elements of θ*(k), θ*(k+1), ..., θ*(k+N−1) are stored in the ring buffer. The predetermined number N represents a ratio of the identification period ΔTID to the control period ΔTCTL (ΔTID/ΔTCTL), and is set to "5", for example.

In step S16, the counter IDCOUNT is set to the predetermined number N. Therefore, in the next execution of this process, the answer to step S12 becomes negative (NO), and the value of the counter IDCOUNT is decremented by "1" in step S13. Thereafter, the process proceeds to step S17. Therefore, steps from S14 to S16 are carried out once in every N times.

In step S17, a model parameter vector θ'(k) is calculated by the moving-averagimg of the limited model parameter vector θ*(n). Specifically, the model parameter stored in the ring buffer is applied to the equations (34) through (37) to calculate model parameters a1'(k), a2'(k), b1'(k), and c1'(k).

Figure 14:
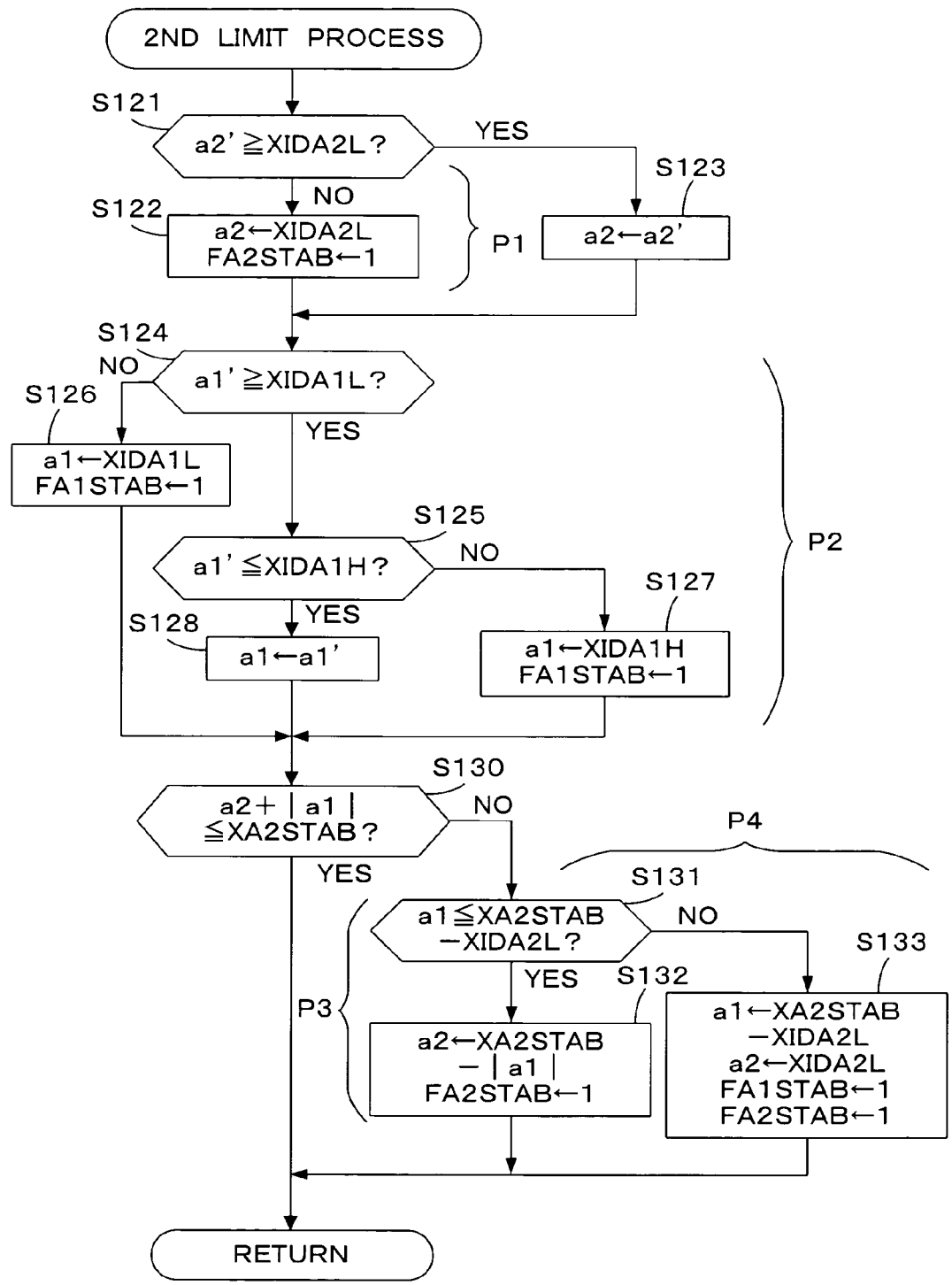
FIG. 14 is a flowchart showing a second limit process executed in the process shown in FIG. 4.

In step S18, a second limit process shown in FIG. 14 is carried out. Specifically, the limit process of the model parameters a1'(k) and a2'(k) calculated in step S17 is carried out to calculate a corrected model parameter vector θL(k). The model parameters b1'(k) and c1'(k) are directly applied to elements b1(k) and c1(k), respectively, of the corrected model parameter vector θ L(k).

Figure 15:
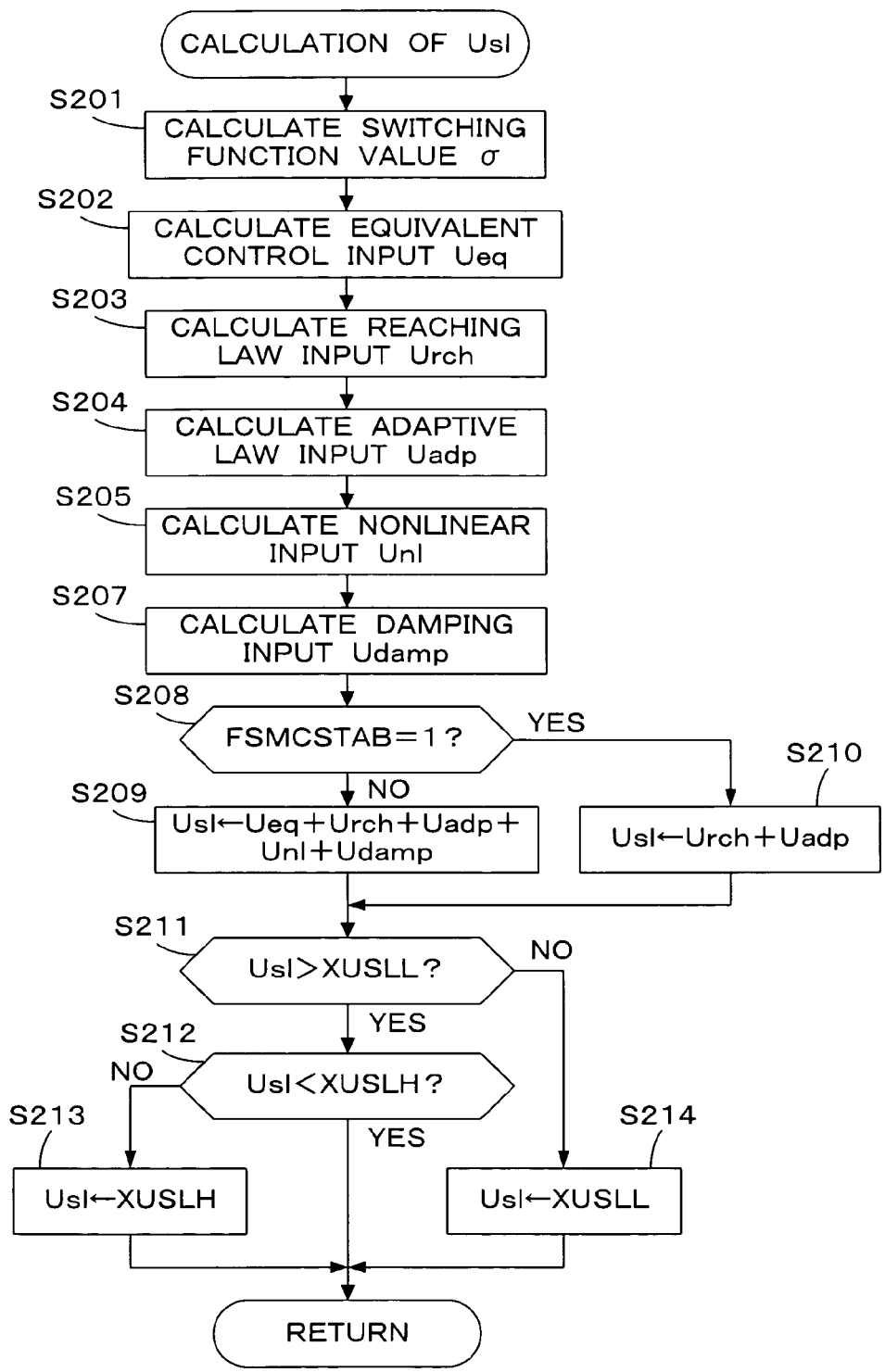
FIG. 15 is a flowchart showing a process of calculating a control input (Usl) executed in the process shown in FIG. 4.

In step S19, a process of calculating a control input Usl(k) shown in FIG. 15 is carried out. Specifically, an equivalent control input Ueq(k), a reaching law input Urch(k), an adaptive law input Uadp(k), a nonlinear input Unl(k), and a damping input Udamp(k) are calculated, and the calculated inputs are summed up to a control input Usl(k) (=duty ratio DUT(k)).

Figure 23:
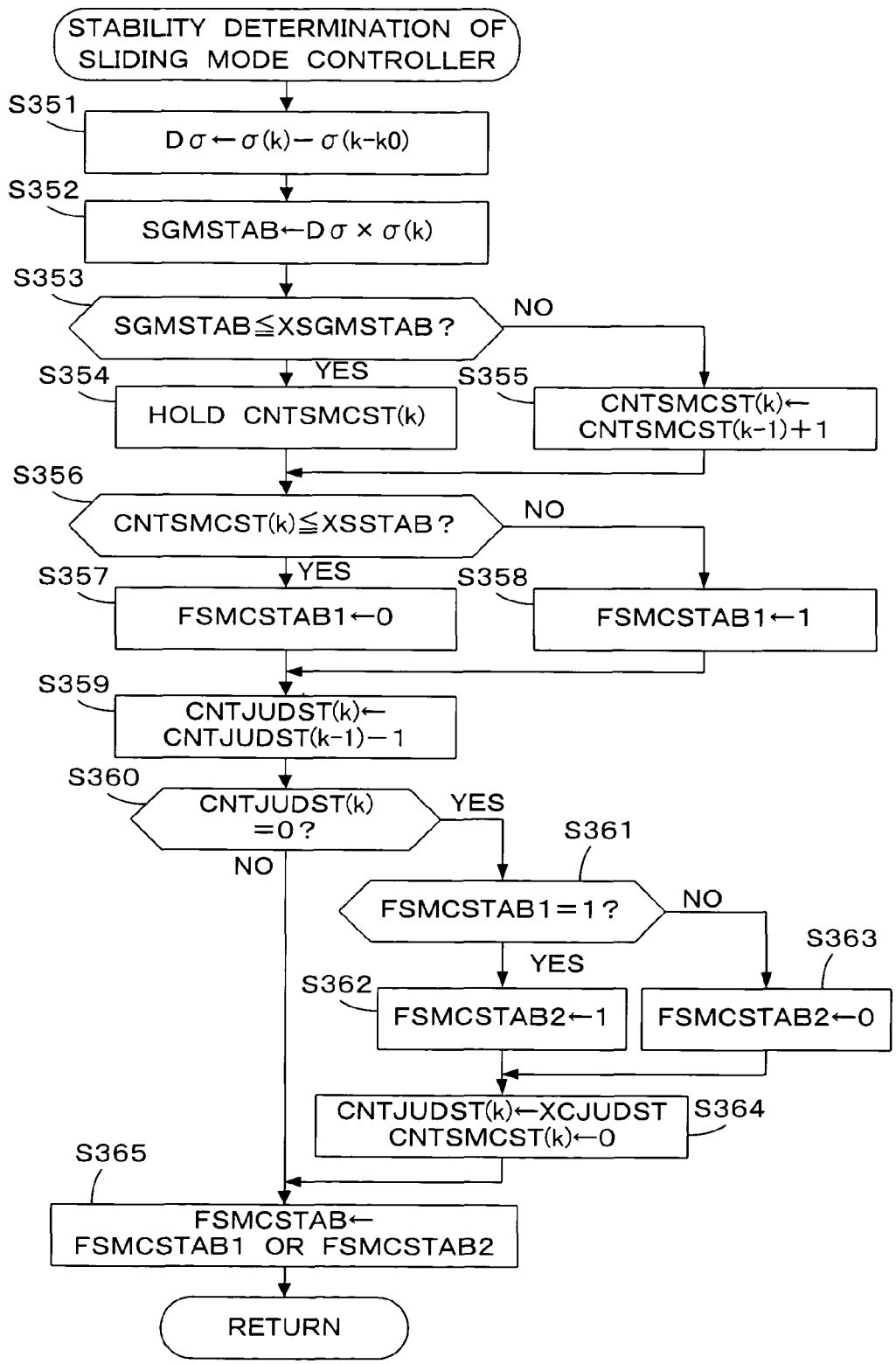
FIG. 23 is a flowchart showing a process of determining stability of the sliding mode controller executed in the process shown in FIG. 4.

In step S20, a process of stability determination of the sliding mode controller shown in FIG. 23 is carried out. Specifically, the stability of the sliding mode controller is determined based on the differential of a Lyapunov function, and a stability determination flag FSMCSTAB is set. The stability determination flag FSMCSTAB is referred to when performing the calculation of the control input Usl(k).

In step S21, the filtered control quantity DUTAV is calculated by the above-described equation (23).

FIG. 6 is a flowchart showing the process of identifying model parameters in step S14 shown in FIG. 4.

In step S41, the gain coefficient vector KP(n) is calculated from the equation (21a). Then, the estimated throttle valve opening deviation amount DTHHAT(n) is calculated from the equation (19a) in step S42.

Figure 7:
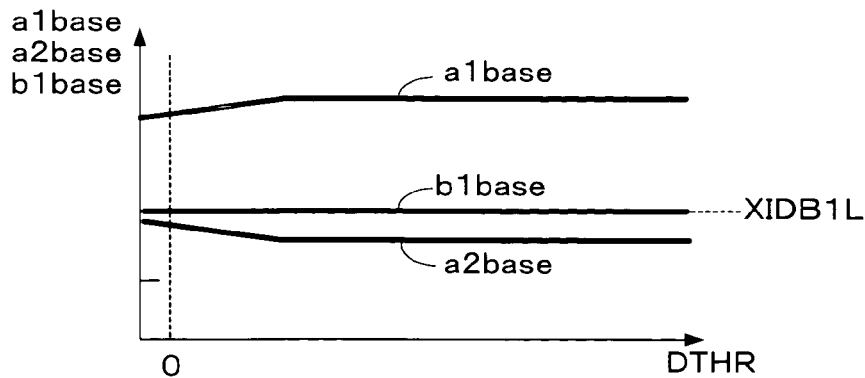
FIG. 7 is a diagram illustrating a method of setting reference model parameters (a1base, a2base, b1base)
Figure 8:
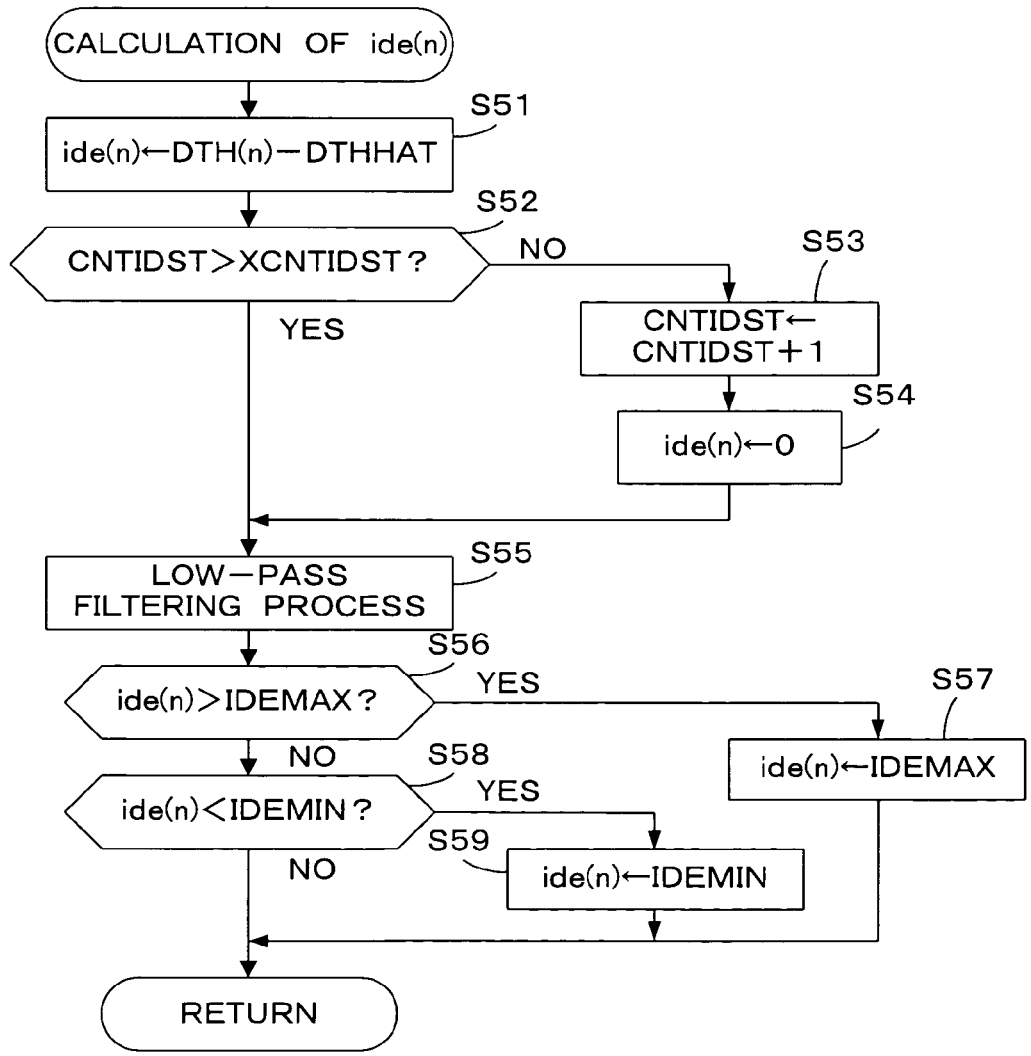
FIG. 8 is a flowchart showing a process of calculating an identifying error (ide) executed in the process shown in FIG. 6.

In step S43, a process of calculating ide(n) shown in FIG. 8 is carried out to calculate the identifying error ide(n). In step S44, the updating vector dθ(n) is calculated from the equations (16e) abd (33). A θbase table shown in FIG. 7 is retrieved according to the target value DTHR to calculate the reference model parameter vector θbase in step S45. In the θbase table, values of the reference model parameters a1base and a2base are actually set. The reference model parameter b1base is set to the minimum value XIDB1L of the model parameter b1. The reference model parameter c1base is set to "0".

In step S46, the model parameter vector θ(n) is calculated from the equation (16d). Thereafter, the process shown in FIG. 6 ends.

FIG. 8 is a flowchart showing a process of calculating an identifying error ide(n) in step S43 shown in FIG. 6.

In step S51, the identifying error ide(n) is calculated from the equation (18). Then, it is determined whether or not the value of a counter CNTIDST which is incremented in step S53 is greater than a predetermined value XCNTIDST that is set according to the dead time d of the controlled object (step S52). XCNTIDST is set to "2", since the dead time d is approximated to "0" in the present embodiment. Since the counter CNTIDST has an initial value of "0", the process first proceeds to step S53, in which the counter CNTIDST is incremented by "1". Next, the identifying error ide(n) is set to "0" in step S54, and the process proceeds to step S55.

Immediately after the identification of the model parameter vector θ(n) starts, no correct identifying error is obtained by the calculation of the equation (18). Therefore, the identifying error ide(n) is set to "0" by steps S52 through S54, without using the calculated result of the equation (18).

If the answer to the step S52 is affirmative (YES), the process immediately proceeds to step S55.

In step S55, the identifying error ide(n) is subjected to a low-pass filtering process. Specifically, a process of correcting the frequency characteristics of the controlled object model is carried out.

In step S56, it is determined whether or not the identifying error ide(n) is greater than a predetermined upper limit value IDEMAX (e.g., "0.2"). If ide(n) is greater than IDEMAX, the identifying error ide(n) is set to the predetermined upper limit value IDEMAX (step S57).

If ide(n) is less than or equal to IDEMAX in step S56, it is further determined whether or not the identifying error ide(n) is less than a predetermined lower limit value IDEMIN (e.g., "−0.15") in step S58. If ide(n) is less than IDEMIN, the identifying error ide(n) is set to the predetermined lower limit value IDEMIN (step S59). If the answer to step S58 is negative, this process immediately ends.

FIG. 9 is a flowchart showing the first limit process carried out in step S15 shown in FIG. 4.

Figure 10:
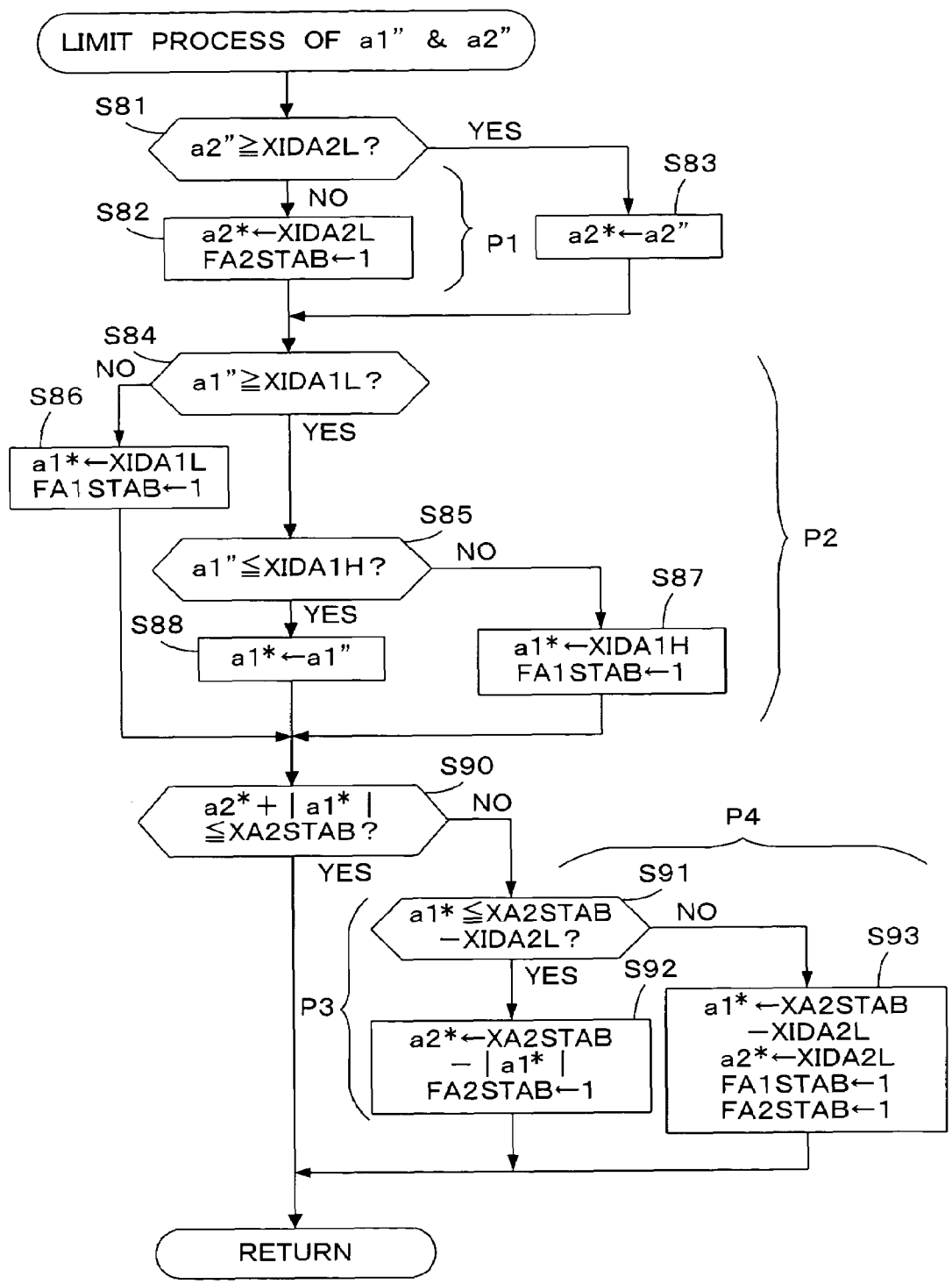
FIG. 10 is a flowchart showing a limit process of model parameters (a1", a2") executed in the process shown in FIG. 9.
Figure 12:
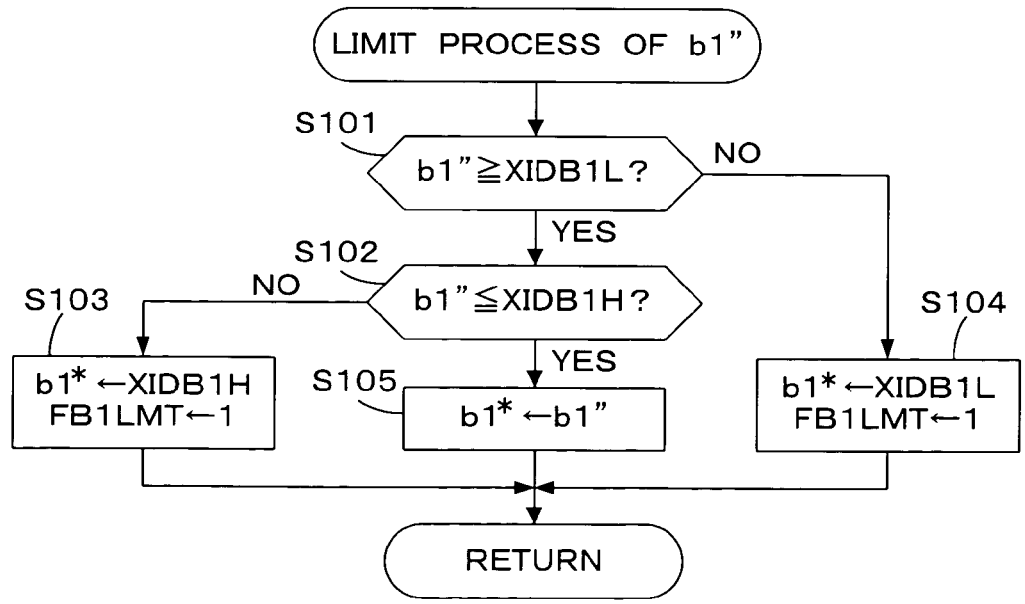
FIG. 12 is a flowchart showing a limit process of a model parameter (b1") executed in the process shown in FIG. 9.
Figure 13:
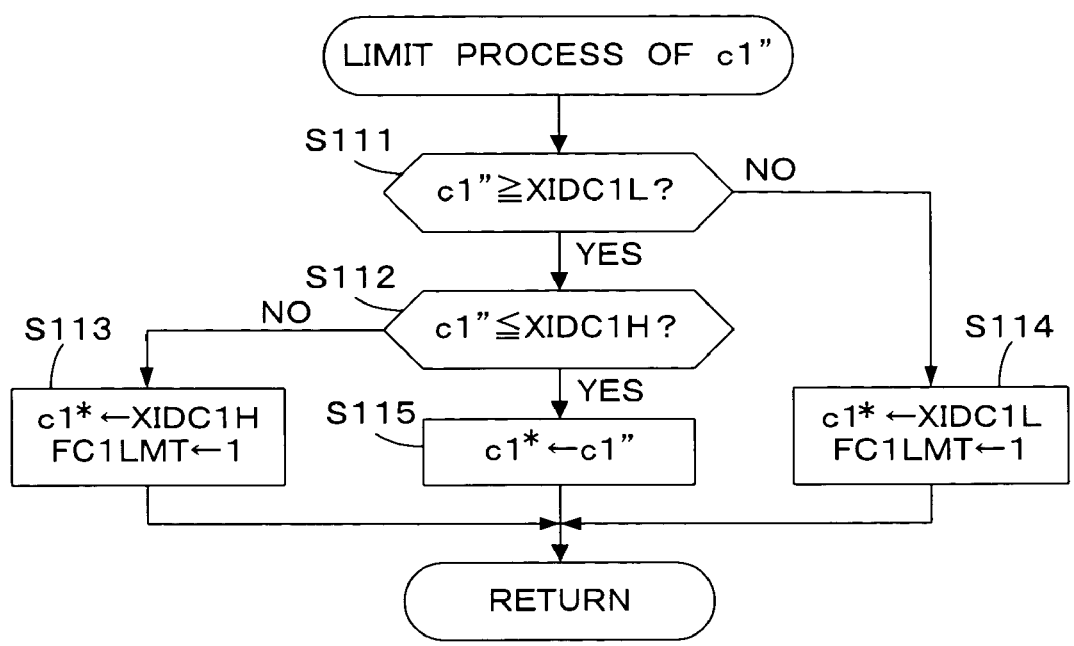
FIG. 13 is a flowchart showing a limit process of a model parameter (c1") executed in the process shown in FIG. 9.

In step S71, flags FA1STAB, FA2STAB, FB1LMT, and FC1LMT used in this process are initialized by setting each flag to "0". In step S72, the limit process of the model parameters a1" and a2" shown in FIG. 10 is executed. In step S73, the limit process of the model parameter b1" shown in FIG. 12 is executed. In step S74, the limit process of the model parameter c1" shown in FIG. 13 is executed.

FIG. 10 is a flowchart showing the limit process of the model parameters a1" and a2" which is carried out in step S72 shown in FIG. 9.

Figure 11:
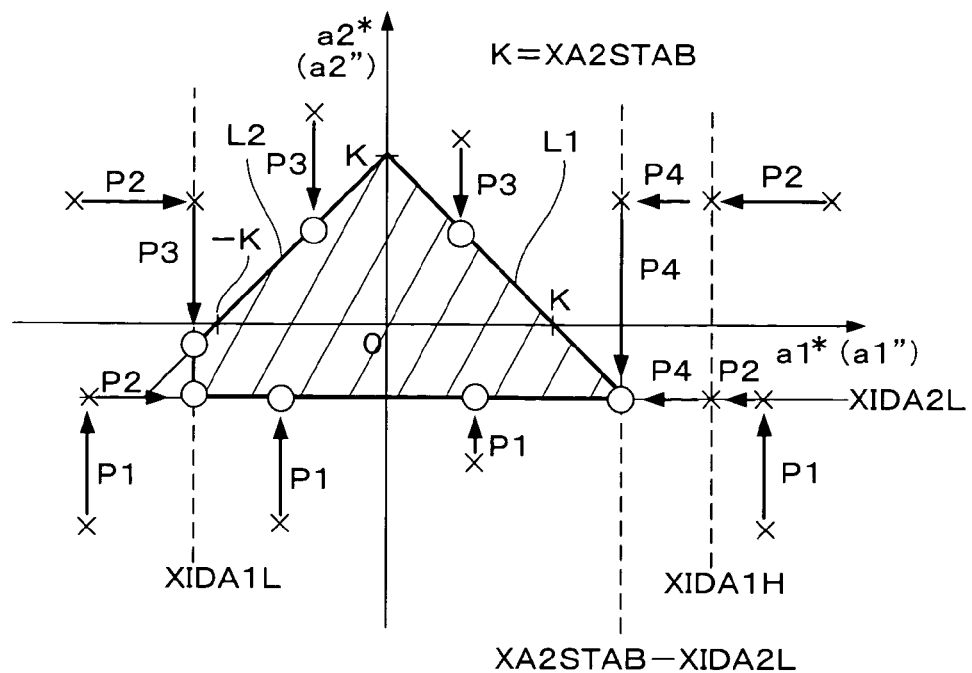
FIG. 11 is a diagram illustrating the process shown in FIG. 10.

FIG. 11 is a diagram illustrating the process shown in FIG. 10, and will be referred to with FIG. 10.

In FIG. 11, combinations of the model parameters a1" and a2" which are required to be limited are indicated by "X" symbols, and the range of combinations of the model parameters a1" and a2" which are stable is indicated by a hatched region (hereinafter referred to as "stable region"). The process shown in FIG. 10 is a process of moving the combinations of the model parameters a1" and a2" which are in the outside of the stable region into the stable region at positions indicated by "○" symbols.

In step S81, it is determined whether or not the model parameter a2" is greater than or equal to a predetermined a2 lower limit value XIDA2L. The predetermined a2 lower limit value XIDA2L is set to a negative value greater than "−1". Stable model parameters a1* and a2* are obtained when setting the predetermined a2 lower limit value XIDA2L to "−1". However, the predetermined a2 lower limit value XIDA2L is set to a negative value greater than "−1" because the matrix A defined by the equation (40) to the "n"th power may occasionally become unstable (which means that the model parameters a1" and a2" do not diverge, but oscillate).

$$A = \begin{bmatrix} a1^* & a2^* \\ 1 & 0 \end{bmatrix} \quad (40)$$

If a2" is less than XIDA2L in step S81, then the model parameter a2* is set to the lower limit value XIDA2L, and an a2 stabilizing flag FA2STAB is set to "1" in step S82. When the a2 stabilizing flag FA2STAB is set to "1", this indicates that the model parameter a2* is set to the lower limit value XIDA2L. In FIG. 11, the correction of the model parameter in a limit process P1 of steps S81 and S82 is indicated by the arrow lines with "P1".

If the answer to step S81 is affirmative (YES), i.e., if a2" is greater than or equal to XIDA2L, then the model parameter a2* is set to the model parameter a2" in step S83.

In steps S84 and S85, it is determined whether or not the model parameter a1" is in a range defined by a predetermined a1 lower limit value XIDA1L and a predetermined a1 upper limit value XIDA1H. The predetermined a1 lower limit value XIDA1L is set to a value which is equal to or greater than "−2" and less than "0", and the predetermined a1 upper limit value XIDA1H is set to 2, for example.

If the answers to steps S84 and S85 are affirmative (YES), i.e., if a1" is greater than or equal to XIDA1L and less than or equal to XIDA1H, then the model parameter a1* is set to the model parameter a1" in step S88.

If a1" is less than XIDA1L in step S84, then the model parameter a1* is set to the lower limit value XIDA1L and an a1* stabilizing flag FA1LSTAB is set to "1" in step S86. If a1" is greater than XIDA1H in step S85, then the model parameter a1 is set to the upper limit value XIDA1H and the a1 stabilizing flag FA1STAB is set to "1" in step S87. When the a1 stabilizing flag FA1STAB is set to "1", this indicates that the model parameter a1* is set to the lower limit value XIDA1L or the upper limit value XIDA1I. In FIG. 11, the correction of the model parameters in a limit process P2 of steps S84 through S87 is indicated by the arrow lines with "P2".

In step S90, it is determined whether or not the sum of the absolute value of the model parameter a1* and the model parameter a2* is equal to or less than a predetermined stability determining value XA2STAB. The predetermined stability determining value XA2STAB is set to a value close to "1" but less than "1" (e.g., "0.99").

Straight lines L1 and L2 shown in FIG. 11 satisfy the following equation (41).

$$a2^* + |a1^*| = XA2STAB \quad (41)$$

Therefore, in step S90, it is determined whether or not the combination of the model parameters a1* and a2* is placed at a position on or lower than the straight lines L1 and L2 shown in FIG. 11. If the answer to step S90 is affirmative (YES), then the limit process immediately ends, since the combination of the model parameters a1* and a2* is in the stable region shown in FIG. 11.

If the answer to step S90 is negative (NO), then it is determined whether or not the model parameter a1* is less than a value obtained by subtracting the predetermined a2 lower limit value XIDA2L from the predetermined stability determining value XA2STAB in step S91 (since XIDA2L is less than "0", (XA2STAB−XIDA2L) is greater than XA2STAB). If the model parameter a1* is equal to or less than (XA2STAB−XIDA2L), then the model parameter a2* is set to (XA2STAB−|a1*|) and the a2 stabilizing flag FA2STAB is set to "1" in step S92.

If the model parameter a1* is greater than (XA2STAB−XIDA2L) in step S91, then the model parameter a1* is set to (XA2STAB−XIDA2L) in step S93. Further in step S93, the model parameter a2* is set to the predetermined a2 lower limit value XIDA2L, and the a1 stabilizing flag FA1STAB and the a2 stabilizing flag FA2STAB are set to "1".

In FIG. 11, the correction of the model parameters in a limit process P3 of steps S91 and S92 is indicated by the arrow lines with "P3", and the correction of the model parameters in a limit process P4 of steps S91 and S93 is indicated by the arrow lines with "P4".

As described above, the limit process shown in FIG. 10 is carried out to bring the model parameters a1" and a2" into the stable region shown in FIG. 11, thus calculating the model parameters a1* and a2*.

FIG. 12 is a flowchart showing a limit process of the model parameters b1", which is carried out in step S73 shown in FIG. 9.

In steps S101 and S102, it is determined whether or not the model parameters b1" is in a range defined by a predetermined b1 lower limit value XIDB1L and a predetermined b1 upper limit value XIDB1H. The predetermined b1 lower limit value XIDB1L is set to a predetermined positive value (e.g., "0.1"), and the predetermined b1 upper limit value XIDB1H is set to "1", for example.

If the answer to steps S101 and S102 is affirmative (YES), i.e., if b1" is greater than or equal to XIDB1L and less than or equal to XIDB1H, then the model parameter b1* is set to the model parameter b1" in step S105.

If b1" is less than XIDB1L in step S101, then the model parameter b1* is set to the lower limit value XIDB1L, and a b1 limiting flag FB1LMT is set to "1" in step S104. If b1" is greater than XIDB1H in step S102, then the model parameter b1* is set to the upper limit value XIDB1H, and the b1 limiting flag FB1LMT is set to "1" in step S103. When the b1 limiting flag FB1LMT is set to "1", this indicates that the model parameter b1* is set to the lower limit value XIDB1L or the upper limit value XIDB1H.

FIG. 13 is a flowchart showing a limit process of the model parameter c1", which is carried out in step S74 shown in FIG. 9.

In steps S111 and S112, it is determined whether or not the model parameters c1" is in a range defined by a predetermined c1 lower limit value XIDC1L and a predetermined c1 upper limit value XIDC1H. The predetermined c1 lower limit value XIDC1L is set to "−60", for example, and the predetermined c1 upper limit value XIDC1H is set to "60", for example.

If the answer to steps S11 and S112 is affirmative (YES), i.e., if c1" is greater than or equal to XIDC1L and less than or equal to XIDC1H, then the model parameter c1* is set to the model parameter c1" in step S115.

If c1" is less than XIDC1L in step S111, then the model parameter c1* is set to the lower limit value XIDC1L, and a c1 limiting flag FC1LMT is set to "1" in step S114. If c1" is greater than XIDC1H in step S112, then the model parameter c1* is set to the upper limit value XIDC1H, and the c1 limiting flag FC1LMT is set to "1" in step S113. When the c1 limiting flag FC1LMT is set to "1", this indicates that the corrected model parameter c1 is set to the lower limit value XIDC1L or the upper limit value XIDC1H.

FIG. 14 is a flowchart showing the second limit process carried out in step S18 shown in FIG. 4. The second limit process is essentially the same as the first limit process shown in FIG. 10 except that the model parameters a1" and a2" in the limit process shown in FIG. 10 are replaced respectively with the model parameters a1' and a2', and the model parameters a1* and a2* in the limit process shown in FIG. 10 are replaced respectively with the model parameters a1 and a2. Specifically, the moving-averaged model parameters a1' and a2' are subjected to a limit process of steps S121 through S133, which is similar to the limit process shown in FIG. 10, thereby calculating corrected model parameters a1 and a2.

FIG. 15 is a flowchart showing a process of calculating a control input Usl, which is carried out in step S19 shown in FIG. 4.

Figure 16:
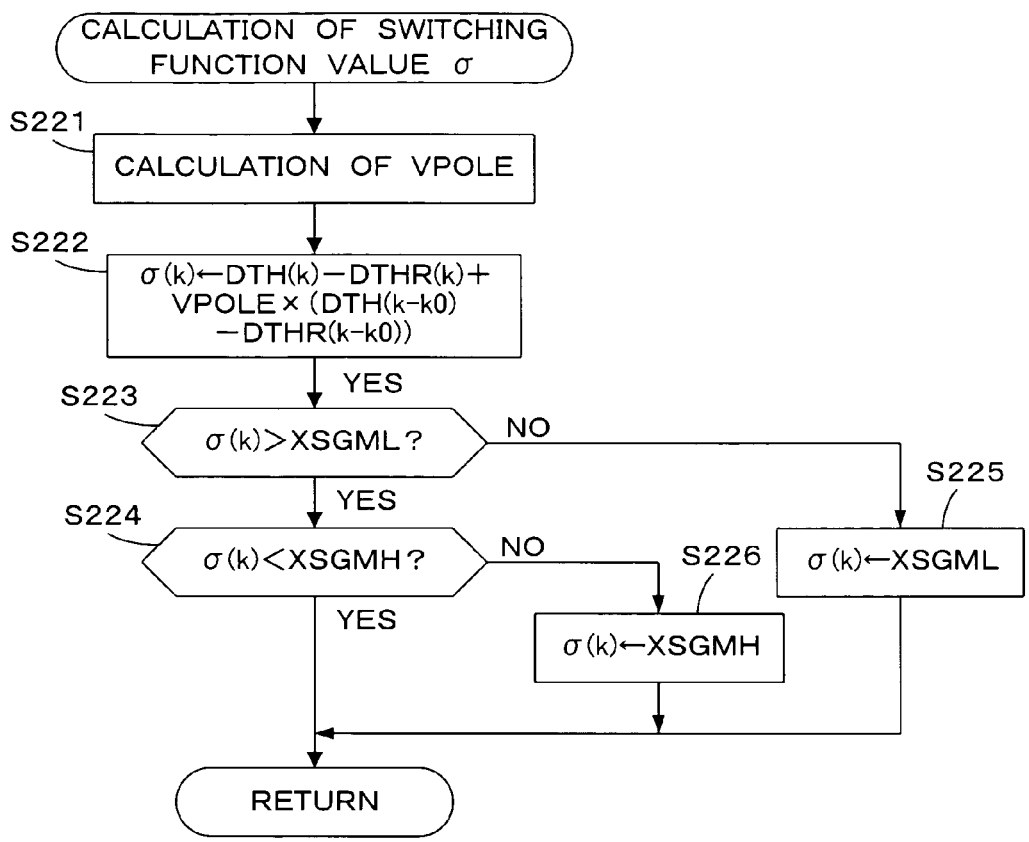
FIG. 16 is a flowchart showing a process of calculating a switching function value ($\sigma$) executed in the process shown in FIG. 15.
Figure 19:
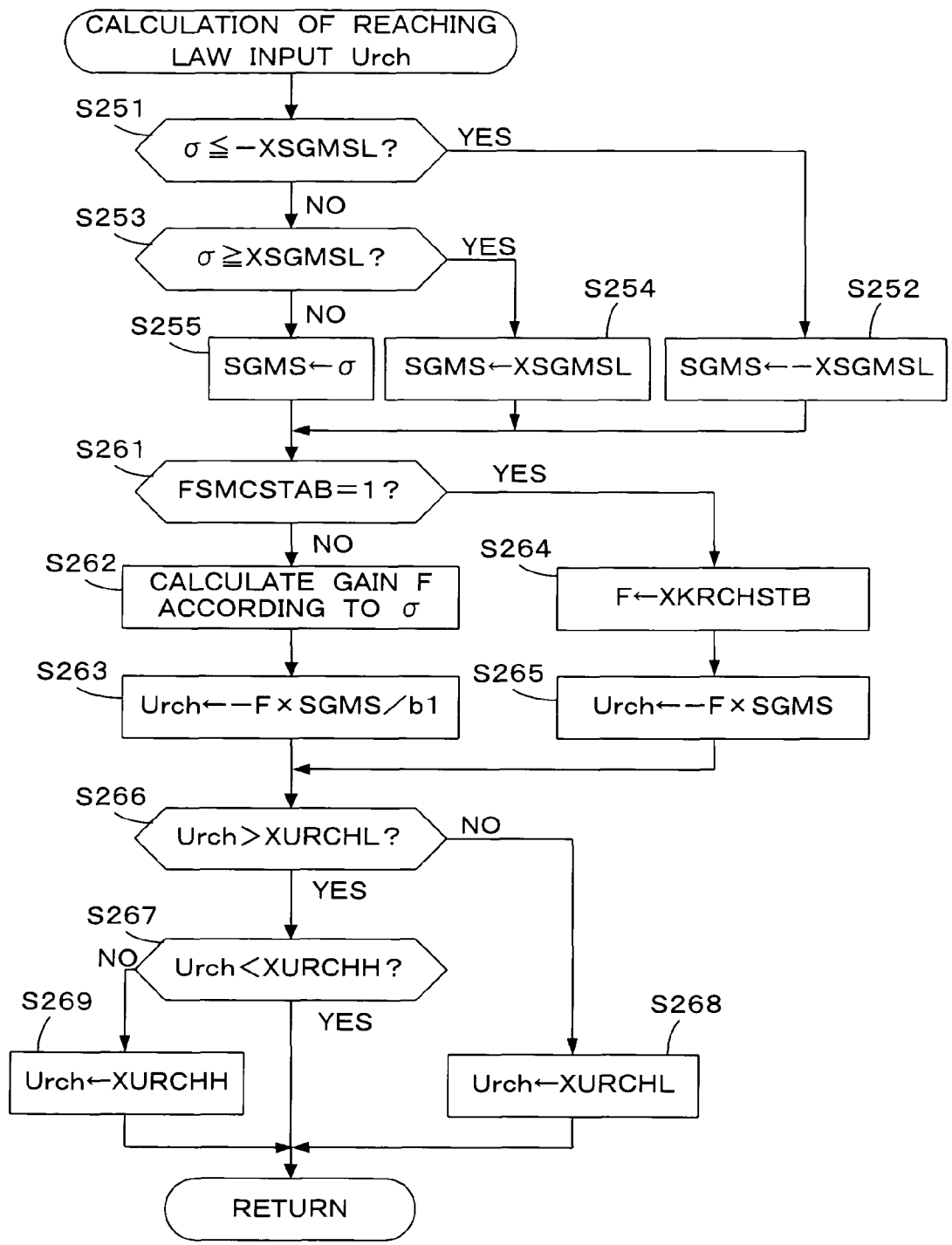
FIG. 19 is a flowchart showing a process of calculating a reaching law input (Urch) executed in the process shown in FIG. 15.
Figure 20:
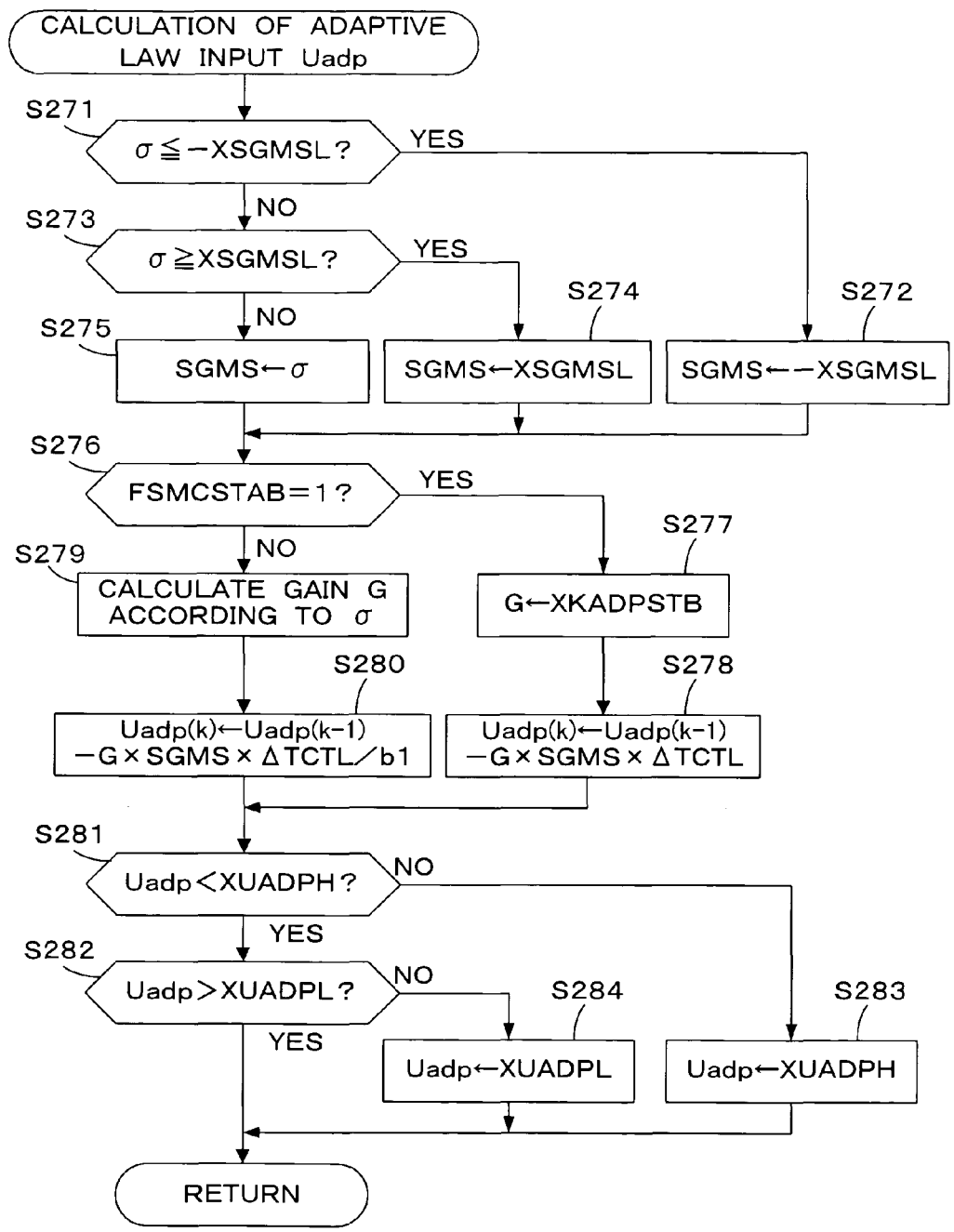
FIG. 20 is a flowchart showing a process of calculating an adaptive law input (Uadp) executed in the process shown in FIG. 15.
Figure 21:
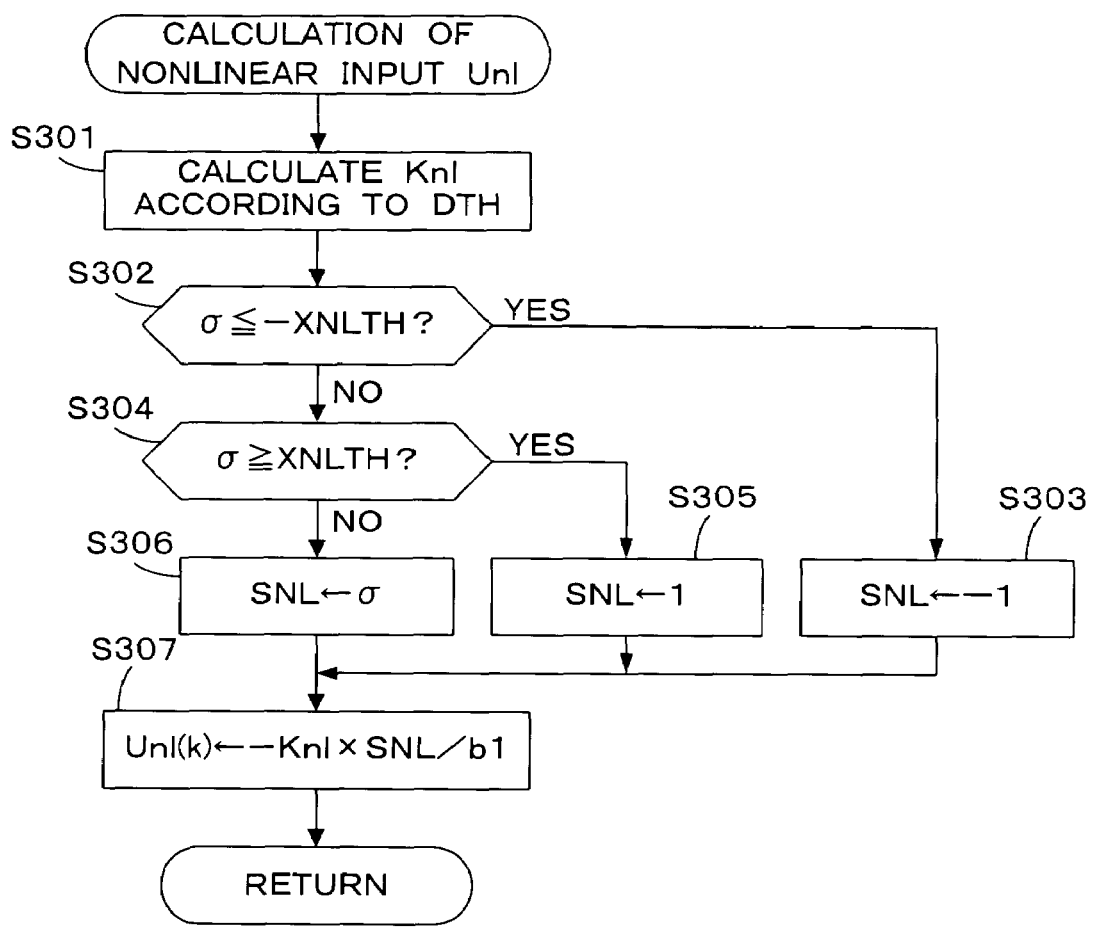
FIG. 21 is a flowchart showing a process of calculating a nonlinear input (Unl) executed in the process shown in FIG. 15.
Figure 22:
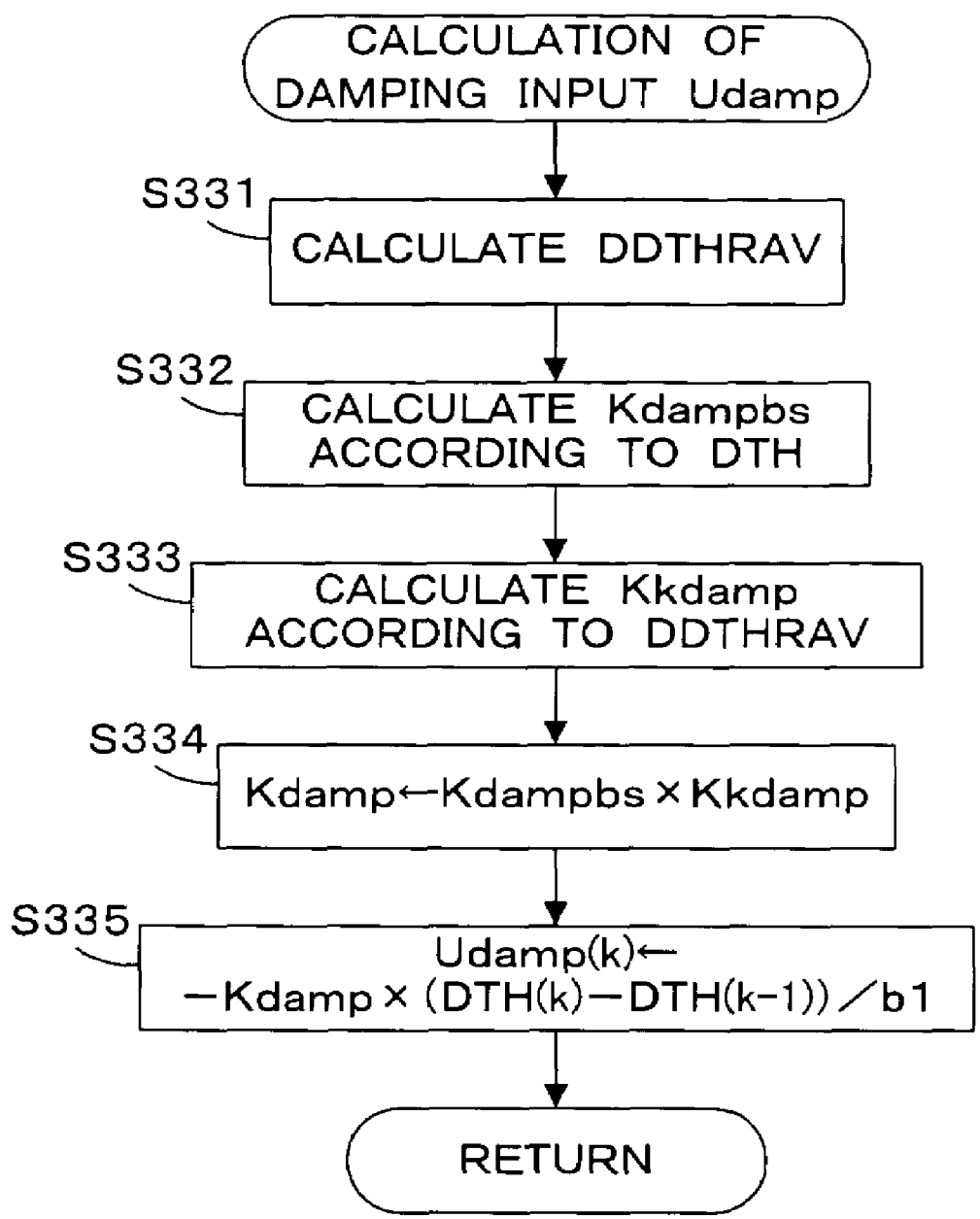
FIG. 22 is a flowchart showing a process of calculating a damping input (Udamp) executed in the process shown in FIG. 15.

In step S201, a process of calculating a switching function value σ shown in FIG. 16 is carried out. In step S202, an equivalent control input Ueq is calculated from the equation (8a). In step S203, a process of calculating a reaching law input Urch shown in FIG. 19 is carried out. In step S204, a process of calculating an adaptive law input Uadp shown in FIG. 20 is carried out. In step S205, a process of calculating a nonlinear input Unl shown in FIG. 21 is carried out. In step S207, a process of calculating a damping input Udamp shown in FIG. 22 is carried out.

In step S208, it is determined whether or not the stability determination flag FSMCSTAB set in a process shown in FIG. 23 is "1". When the stability determination flag FSMCSTAB is set to "1", this indicates that the adaptive sliding mode controller 21 is unstable.

If FSMCSTAB is equal to "0" in step S208, indicating that the adaptive sliding mode controller 21 is stable, then the control inputs Ueq, Urch, Uadp, Unl, and Udamp calculated in steps S202 through S207 are added, thereby calculating the control input Usl in step S209.

If FSMCSTAB is equal to "1" in step S208, indicating that the adaptive sliding mode controller 21 is unstable, then the sum of the reaching law input Urch and the adaptive law input Uadp is calculated as the control input Usl. In other words, the equivalent control input Ueq, the nonlinear input Unl, and the damping input Udamp are not used for calculating the control input Usl, which prevents the control system from becoming unstable.

In steps S211 and S212, it is determined whether or not the calculated control input Usl is in a range defined by a predetermined upper limit value XUSLH and a predetermined lower limit value XUSLL. If the control input Usl is in this range, then the process shown in FIG. 15 immediately ends. If the control input Usl is equal to or less than the predetermined lower limit value XUSLL in step S211, then the control input Usl is set to the predetermined lower limit value XUSLL in step S214. If the control input Usl is equal to or greater than the predetermined upper limit value XUSLH in step S212, then the control input Usl is set to the predetermined upper limit value XUSLH in step S213.

FIG. 16 is a flowchart showing a process of calculating the switching function value σ which is carried out in step S201 shown in FIG. 15.

Figure 17:
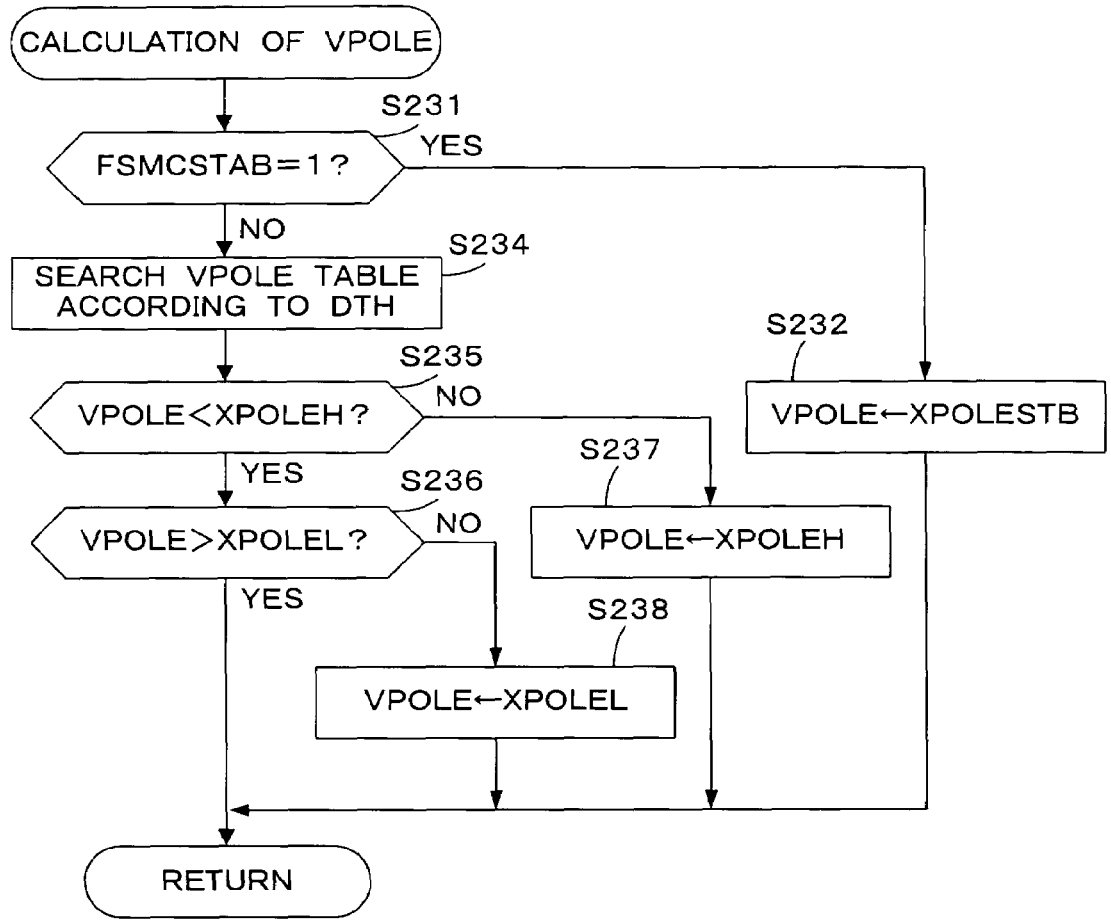
FIG. 17 is a flowchart showing a process of calculating a switching function setting parameter (VPOLE) executed in the process shown in FIG. 16.

In step S221, a VPOLE calculation process shown in FIG. 17 is carried out to calculate the switching function setting parameter VPOLE. Then, the switching function value σ(k) is calculated from the equation (5a) in step S222.

In steps S223 and 224, it is determined whether or not the calculated switching function value σ(k) is in a range defined by a predetermined upper limit value XSGMH and a predetermined lower limit value XSGML. If the calculated switching function value σ(k) is in this range, then the process shown in FIG. 16 immediately ends. If the calculated switching function value σ(k) is equal to or less than the predetermined lower limit value XSGML in step S223, then the calculated switching function value σ(k) is set to the predetermined lower limit value XSGML in step S225. If the calculated switching function value σ(k) is equal to or greater than the predetermined upper limit value XSGMH in step S224, then the calculated switching function value σ(k) is set to the predetermined upper limit value XSGMH in step S226.

FIG. 17 is a flowchart showing the VPOLE calculation process which is carried out in step S221 shown in FIG. 16.

In step S231 shown in FIG. 17, it is determined whether or not the stability determination flag FSMCSTAB is "1". If FSMCSTAB is equal to "1" in step S231, indicating that the adaptive sliding mode controller 21 is unstable, then the switching function setting parameter VPOLE is set to a predetermined stabilizing value XPOLESTB in step S232. The predetermined stabilizing value XPOLESTB is set to a value greater than "−1" but very close to "−1" (e.g., "−0.999").

Figure 18:
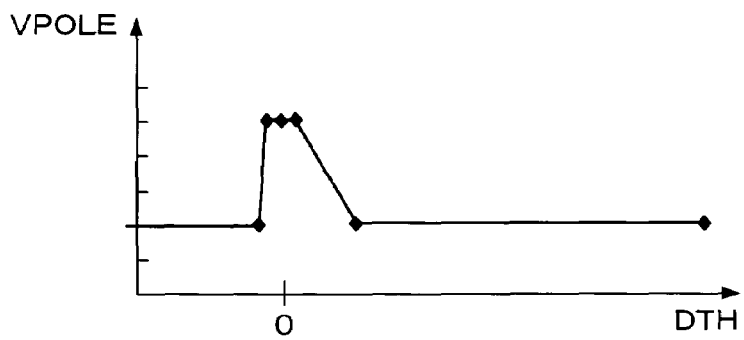
FIG. 18 is a diagram showing a table used in the process shown in FIG. 17.

If FSMCSTAB is equal to "0", indicating that the adaptive sliding mode controller 21 is stable, then a VPOLE table shown in FIG. 18 is retrieved according to the throttle valve opening deviation amount DTH to calculate a switching function setting parameter VPOLE in step S234. The VPOLE table is set so that the switching function setting parameter VPOLE increases when the throttle valve opening deviation amount DTH takes a value in vicinity of "0", i.e., when the throttle valve opening TH takes a value in vicinity of the default opening THDEF, and the switching function setting parameter VPOLE is substantially constant regardless of changes in the throttle valve opening deviation amount DTH when the throttle valve opening deviation amount DTH takes a value which is not in the vicinity of "0". Therefore, when the throttle valve opening TH is in vicinity of the default opening THDEF, the switching function setting parameter VPOLE is set to a relatively large value, which improves the controllability in the vicinity of the default opening THDEF.

In steps S235 and S236, it is determined whether or not the calculated switching function setting parameter VPOLE is in a range defined by a predetermined upper limit value XPOLEH and a predetermined lower limit value XPOLEL. If the switching function setting parameter VPOLE is in this range, then the process shown in FIG. 17 immediately ends. If the switching function setting parameter VPOLE is equal to or less than the predetermined lower limit value XPOLEL in step S236, then the switching function setting parameter VPOLE is set to the predetermined lower limit value XPOLEL in step S238. If the switching function setting parameter VPOLE is equal to or greater than the predetermined upper limit value XPOLEH in step S235, then the switching function setting parameter VPOLE is set to the predetermined upper limit value XPOLEH in step S237.

FIG. 19 is a flowchart showing a process of calculating the reaching law input Urch, which is carried out in step S203 shown in FIG. 15.

In step S251, it is determined whether or not the switching function value σ is equal to or less than a predetermined lower limit value −XSGMSL. If σ is less than or equal to −XSGMSL, then a switching function parameter SGMS is set to the predetermined lower limit value XSGMSL in step S252. If σ is greater than −XSGMSL, it is determined whether or not the switching function value σ is equal or greater than a predetermined upper limit value XSGMSL in step S253. If σ is greater than or equal to XSGMSL, then the switching function parameter SGMS is set to the predetermined upper limit value XSGMSL in step S254. If the switching function value σ falls between the predetermined lower limit value −XSGMSL and the predetermined upper limit value XSGMSL, then the switching function parameter SGMS is set to the switching function value σ in step S255.

The switching function value σ used in calculating the reaching law input Urch is limited in steps S251 through S255. The switching function parameter SGMS is a parameter corresponding to the limited switching function value σ. The limit process makes it possible to prevent the throttle valve opening deviation amount DTH from overshooting with respect to the target value DTHR when the target value DTHR changes abruptly.

In step S261, it is determined whether or not the stability determination flag FSMCSTAB is "1". If the stability determination flag FSMCSTAB is "0", indicating that the adaptive sliding mode controller 21 is stable, then the control gain F is set according to the switching function value σ (Step S 262).

The reaching law input Urch is calculated according to the following equation (42) in step S263. The equation (42) is similar to the equation (9) except that the switching function value σ in the equation (9) is replaced with the switching function parameter SGMS.

$$Urch = -F \times SGMS/b1 \quad (42)$$

If the stability determination flag FSMCSTAB is "1", indicating that the adaptive sliding mode controller 21 is unstable, then the control gain F is set to a predetermined stabilizing gain XKRCHSTB in step S264, and the reaching law input Urch is calculated according to the following equation (43), which does not include the model parameter b1, in step S265.

$$Urch = -F \times SGMS \quad (43)$$

In steps S266 and S267, it is determined whether or not the calculated reaching law input Urch is in a range defined by a predetermined upper limit value XURCHH and a predetermined lower limit value XURCHL. If the reaching law input Urch is in this range, then the process shown in FIG. 19 is immediately put to an end. If the reaching law input Urch is equal to or less than the predetermined lower limit value XURCHL in step S266, then the reaching law input Urch is set to the predetermined lower limit value XURCHL in step S268. If the reaching law input Urch is equal to or greater than the predetermined upper limit value XURCHH in step S267, then the reaching law input Urch is set to the predetermined upper limit value XURCHH in step S269.

As described above, when the adaptive sliding mode controller 21 becomes unstable, the control gain F is set to the predetermined stabilizing gain XKRCHSTB, and the reaching law input Urch is calculated without using the model parameter b1, which brings the adaptive sliding mode controller 21 back to its stable state. When the identifying process carried out by the model parameter identifier 22 becomes unstable, the adaptive sliding mode controller 21 becomes unstable. Therefore, by using the equation (43) that does not include the model parameter b1 which has become unstable, the adaptive sliding mode controller 21 can be stabilized.

FIG. 20 is a flowchart showing a process of calculating an adaptive law input Uadp, which is carried out in step S204 shown in FIG. 15.

In step S271, it is determined whether or not the switching function value σ is equal to or less than a predetermined lower limit value −XSGMSL. If σ is less than or equal to −XSGMSL, then a switching function parameter SGMS is set to the predetermined lower limit value −XSGMSL in step S272. If σ is greater than −XSGMSL, it is determined whether or not the switching function value σ is equal or greater than a predetermined upper limit value XSGMSL in step S273. If σ is greater than or equal to XSGMSL, then the switching function parameter SGMS is set to the predetermined upper limit value XSGMSL in step S274. If the switching function value σ falls between the predetermined lower limit value −XSGMSL and the predetermined upper limit value XSGMSL, then the switching function parameter SGMS is set to the switching function value σ in step S275.

The switching function value σ used in calculating the adaptive law input Uadp is limited in steps S271 through S275. The switching function parameter SGMS is a parameter corresponding to the limited switching function value σ. The limit process makes it possible to prevent the throttle valve opening deviation amount DTH from overshooting with respect to the target value DTHR when the target value DTHR changes abruptly.

In step S276, it is determined whether or not the stability determination flag FSMCSTAB is "1". If FSMCSTAB is equal to "0", indicating that the adaptive sliding mode controller 21 is stable, then the control gain G is set according to the switching function value σ in step S279.

Then, the switching function parameter SGMS and the control gain G are applied to the equation (44) shown below to calculate an adaptive law input Uadp(k) in step S280. The equation (44) is similar to the equation (10) except that the switching function value σ in the equation (10) is replaced with the switching function parameter SGMS.

$$Uadp(k) = Uadp(k-1) - G \times SGMS \times \Delta TCTL/b1 \quad (44)$$

If FSMCSTAB is equal to "1" in step S276, indicating that the adaptive sliding mode controller 21 is unstable, then the control gain G is set to a predetermining stabilized gain XKADPSTB in step S277, and an adaptive law input Uadp(k) is calculated from the equation (45) in step S278. The equation (45) is an equation obtained by removing the model parameter b1 from the equation (44).

$$Uadp(k) = Uadp(k-1) - G \times SGMS \times \Delta TCTL \quad (45)$$

In steps S281 and 282, it is determined whether or not the calculated adaptive law input Uadp is in a range defined by a predetermined upper limit value XUADPH and a predetermined lower limit value XUADPL. If the adaptive law input Uadp is in this range, then the process shown in FIG. 20 immediately ends. If the adaptive law input Uadp is equal to or less than the predetermined lower limit value XUADPL in step S282, then the adaptive law input Uadp is set to the predetermined lower limit value XUADPL in step S284. If the adaptive law input Uadp is equal to or greater than the predetermined upper limit value XUADPH in step S281, then the adaptive law input Uadp is set to the predetermined upper limit value XUADPH in step S283.

FIG. 21 is a flowchart showing a process of calculating a nonlinear input Unl, which is carried out in step S205 shown in FIG. 15.

In step S301, a nonlinear input gain Knl is calculated according to the throttle valve opening deviation amount DTH. In step S302, it is determined whether or not the switching function value σ is equal to or less than a predetermined lower limit value −XNLTH. If σ is greater than −XNLTH, then it is determined whether the switching function value σ is equal to or greater than a predetermined upper limit value XNLTH in step S304. If the switching function value σ falls between the predetermined upper limit value XNLTH and the predetermined lower limit value −XNLTH, then a nonlinear input parameter SNL is set to the switching function value σ (step S306).

If the switching function value σ is equal to or less than the predetermined lower limit value −XNLTH, then the nonlinear input parameter SNL is set to "−1" in step S303. If the switching function value σ is equal to or greater than the predetermined upper limit value XNLTH, then the nonlinear input parameter SNL is set to "1" in step S305.

In step S307, a nonlinear input Unl(k) is calculated according to the following equation (46).

$$Unl(k)=-Knl \times SNL/b1 \qquad (46)$$

In the process shown in FIG. 21, the nonlinear input parameter SNL is used in place of the sign function sgn(σ(k)) in the equation (11), and the switching function value σ is directly applied in a predetermined range where the absolute value of the switching function value σ is small. This makes it possible to suppress the chattering due to the nonlinear input Unl.

FIG. 22 is a flowchart showing a process of calculating a damping input Udamp which is carried out in step S207 shown in FIG. 15.

In step S331, a moving average value DTHRAV of an amount of change in the target value DTHR is calculated according to the above-described equation (15). In step S332, a basic value Kdampbs of a damping control gain is calculated according to the throttle valve opening deviation amount DTH. In step S333, a correction coefficient Kkdamp of a damping control gain is calculated according to the moving average value DDTHRAV in step S333.

In step S334, a damping control gain Kdamp is calculated by multiplying the basic value Kdampbs by the correction coefficient Kkdamp. Then, a damping input Udamp(k) is calculated according to the following equation (13) (shown again).

$$Udamp(k)=-Kdamp \times (DTH(k)-DTH(k-1))/b1 \qquad (13)$$

FIG. 23 is a flowchart showing a process of stability determination of the sliding mode controller, which is carried out in step S20 shown in FIG. 4. In this process, the stability is determined based on the differential of a Lyapunov function, and the stability determination flag FSMCSTAB is set according to the result of the stability determination.

In step S351, a switching function change amount Dσ is calculated from the following equation (50). A stability determining parameter SGMSTAB is calculated from the following equation (51) in step S352.

$$D\sigma=\sigma(k)-\sigma(k-k0) \qquad (50)$$

$$SGMSTAB=D\sigma \times \sigma(k) \qquad (51)$$

In step S353, it is determined whether or not the stability determining parameter SGMSTAB is equal to or less than a stability determining threshold XSGMSTAB. If SGMSTAB is greater than XSGMSTAB, then it is determined that the adaptive sliding mode controller 21 may possibly be unstable, and an unstability detecting counter CNTSMCST is incremented by "1" in step S355. If SGMSTAB is less than or equal to XSGMSTAB, then the adaptive sliding mode controller 21 is determined to be stable, and the count of the unstability detecting counter CNTSMCST is not incremented but maintained in step S354.

In step S356, it is determined whether or not the value of the unstability detecting counter CNTSMCST is equal to or less than a predetermined count XSSTAB. If CNTSMCST is less than or equal to XSSTAB, then the adaptive sliding mode controller 21 is determined to be stable, and a first determination flag FSMCSTAB1 is set to "0" in step S357.

If CNTSMCST is greater than XSSTAB, then the adaptive sliding mode controller 21 is determined to be unstable, and the first determination flag FSMCSTAB1 is set to "1" in step S358. The value of the unstability detecting counter CNTSMCST is initialized to "0" when the ignition switch is turned on.

In step S359, a stability determining period counter CNTJUDST is decremented by "1". It is then determined whether or not the value of the stability determining period counter CNTJUDST is "0" in step S360. The value of the stability determining period counter CNTJUDST is initialized to a predetermined determining count XCJUDST when the ignition switch is turned on. Initially, therefore, the answer to step S360 is negative (NO), and the process immediately goes to step S365.

If the value of the stability determining period counter CNTJUDST subsequently becomes "0", then the process goes from step S360 to step S361, in which it is determined whether or not the first determination flag FSMCSTAB1 is "1". If the first determination flag FSMCSTAB1 is "0", then a second determination flag FSMCSTAB2 is set to "0" in step S363. If the first determination flag FSMCSTAB1 is "1", then the second determination flag FSMCSTAB2 is set to "1" in step S362.

In step S364, the value of the stability determining period counter CNTJUDST is set to the predetermined determining count XCJUDST, and the unstability detecting counter CNTSMCST is set to "0". Thereafter, the process goes to step S365.

In step S365, the stability determination flag FSMCSTAB is set to the logical sum of the first determination flag FSMCSTAB1 and the second determination flag FSMCSTAB2. The second determination flag FSMCSTAB2 is maintained at "1" until the value of the stability determining period counter CNTJUDST becomes "0", even if the answer to step S356 becomes affirmative (YES) and the first determination flag FSMCSTAB1 is set to "0". Therefore, the stability determination flag FSMCSTAB is also maintained at "1" until the value of the stability determining period counter CNTJUDST becomes "0".

Figure 26:
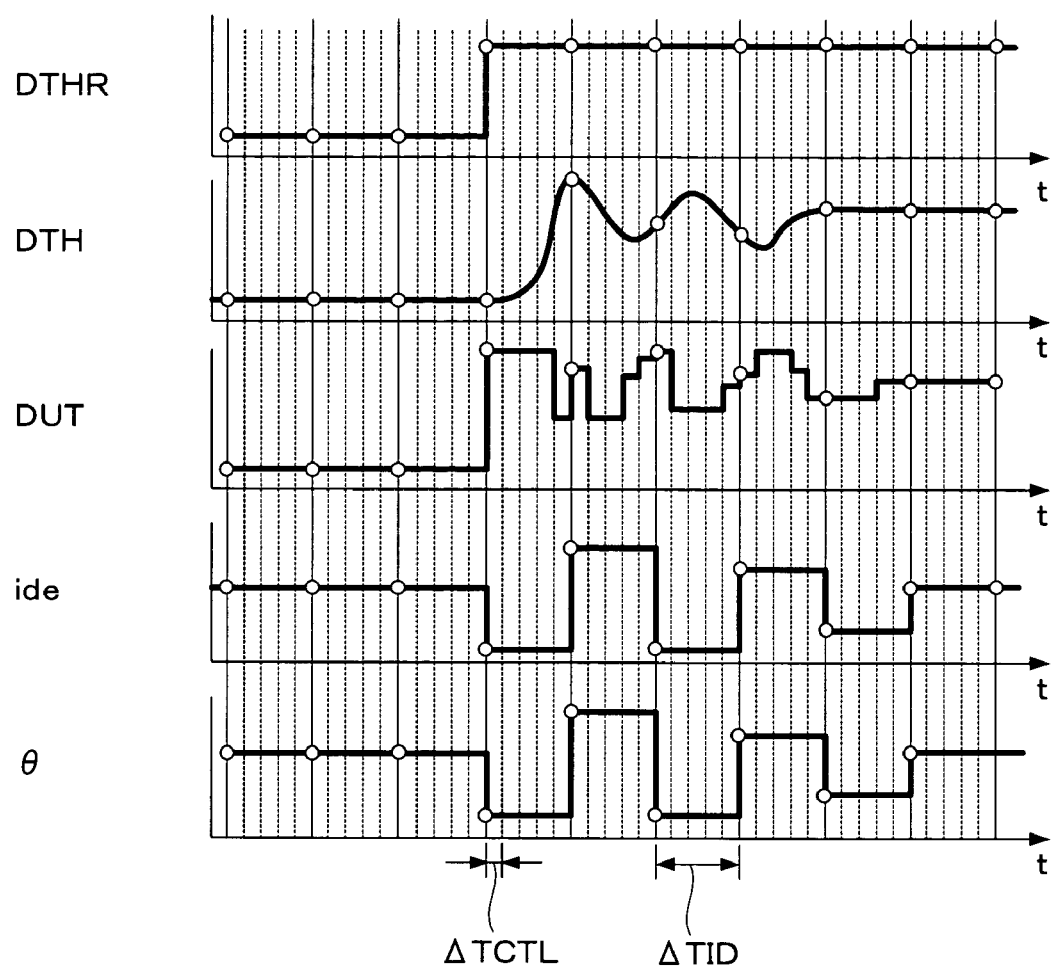
FIG. 26 is a time chart illustrating a step-response characteristic of the control system when the filtering of the control input (DUT) is not performed.

FIG. 26 is a time chart showing step responses when the control quantity DUT is used as it is, for identifying the model parameters.

When the target value DTHR changes stepwise, the identifying error ide greatly changes due to changes in the control quantity DUT, which makes the model parameters (θ) greatly change. As a result, the throttle valve opening deviation amount DTH, which is a controlled output, vibrates.

Figure 27:
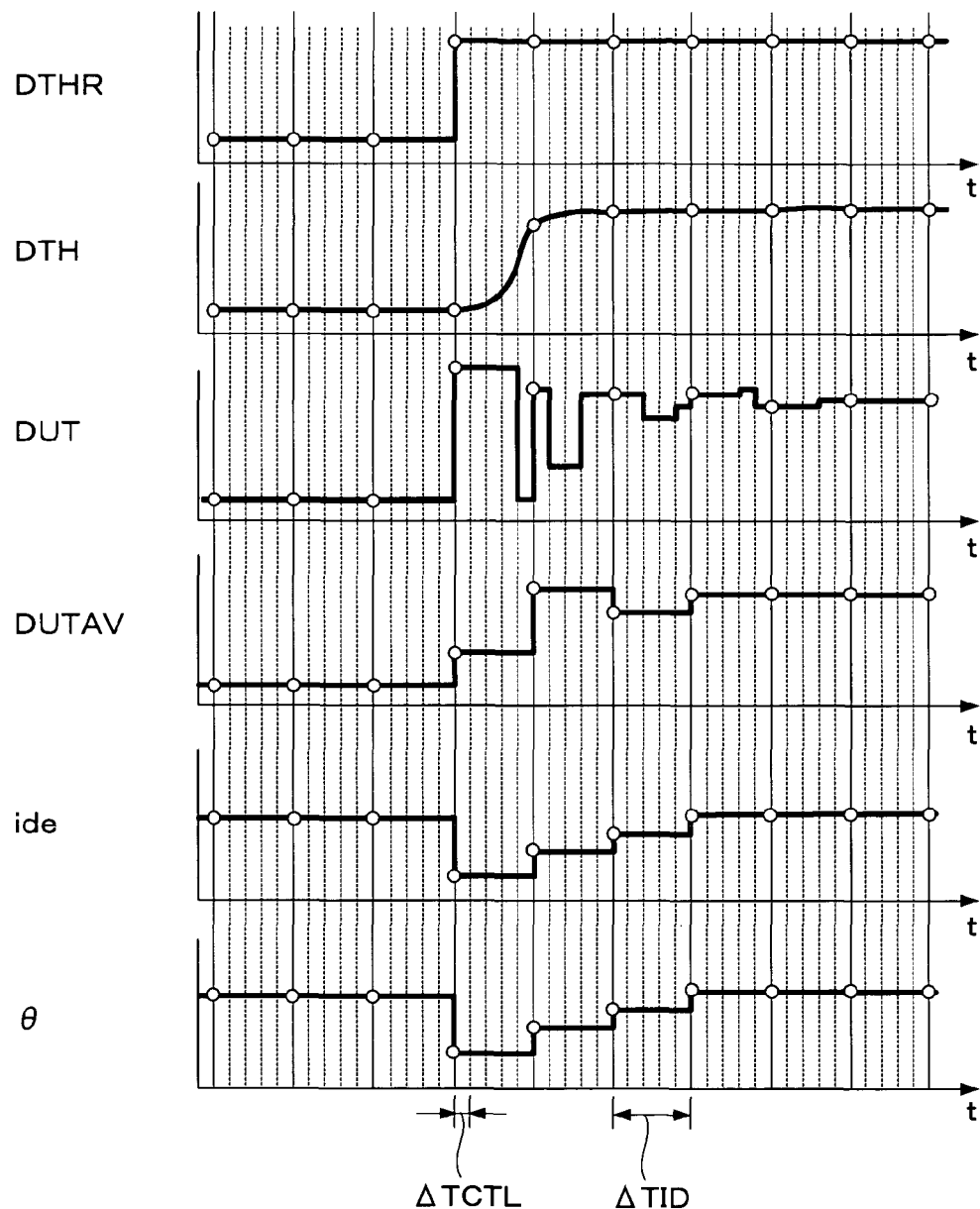
FIG. 27 is a time chart illustrating a step-response characteristic of the control system when using the filtered control quantity (DUTAV).

FIG. 27 is a time chart showing step responses when the filtered control quantity DUTAV is used for identifying the model parameters.

The filtered control quantity DUTAV changes gradually compared with the control quantity DUT, so that changes in the identifying error ide becomes small. Accordingly, changes in the identified model parameters (θ) also becomes small, and the throttle valve opening deviation amount DTH does not vibrate. As a result, good controllability can be obtained.

In this embodiment, the ECU 7 constitutes a controller, a identifier, and a filter which are recited in claims. Specifically, step S19 in FIG. 4 (the process of FIG. 16) corresponds to the controller, and steps S12 through S18 in FIG. 4 correspond to the identifier. Step S21 in FIG. 4 corresponds to the filter.

Second Embodiment

Figure 24:
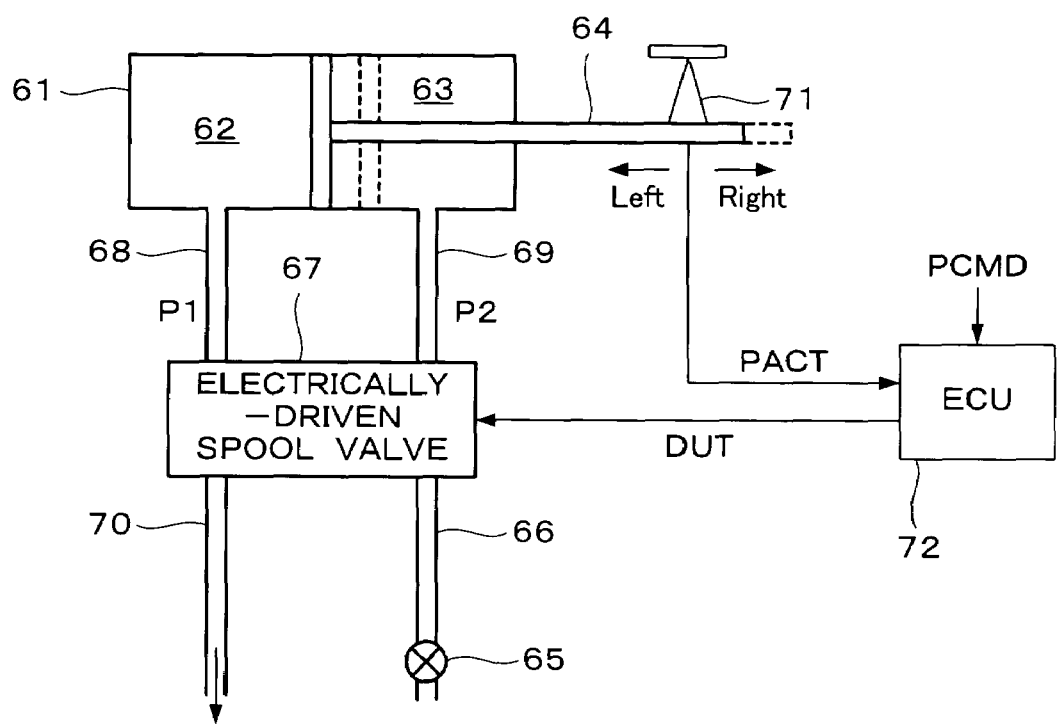
FIG. 24 is a schematic diagram of a hydraulic positioning device according to a second embodiment of the present invention.

FIG. 24 is a diagram showing the configuration of a hydraulic positioning device and its control system, which is a control system for a plant according to a second embodiment of the present invention. Such a hydraulic positioning device can be used for a continuously variable valve timing mechanism for continuously varying the valve timing of the intake and exhaust valves. The continuously variable valve timing mechanism changes rotational phases of the cams for driving the intake and exhaust valves to shift the opening/closing timing of the intake and exhaust valves, which improves the charging efficiency of the engine and reduces the pumping loss of the engine.

The hydraulic positioning device includes a piston 64, a hydraulic cylinder 61 in which the piston 64 is fitted, an electrically-driven spool valve 67, a hydraulic pump 65, an oil pressure supply line 66 for supplying an oil pressure from the hydraulic pump 65 to the electrically-driven spool valve 67, a first oil passage 68 for supplying a first oil pressure P1 to a first oil pressure chamber 62 of the hydraulic cylinder 61, a second oil passage 69 for supplying a second oil pressure P2 to a second oil pressure chamber 63 of the hydraulic cylinder 61, and an oil pressure release line 70 for returning hydraulic oil discharged from the electrically-driven spool valve 67 to an oil pan (not shown).

A potentiometer 71 is provided for detecting a position PACT of the piston 64, and a signal indicating the detected position PACT is supplied to an electronic control unit (ECU) 72.

A target position PCMD is input to the ECU 72. The ECU 72 calculates a control quantity DUT so that the detected position PACT coincides with the target position PCMD, and supplies an electrical signal according to the control quantity DUT to the electrically-driven spool valve 67.

The electrically-driven spool valve 67 moves the position of a valve element (not shown) according to the control quantity DUT, and outputs the first and second oil pressure P1 and P2 according to the position of the valve element. When the pressure difference DP (=P1−P2) between the first and second oil pressures P1 and P2 is a positive value, the piston 64 moves to the right as viewed in FIG. 24. When the pressure difference DP is a negative value, the piston 64 moves to the left as viewed in FIG. 24. In the condition where the detected position PACT coincides with the target position PCMD, the pressure difference DP is maintained at "0".

Figure 25:
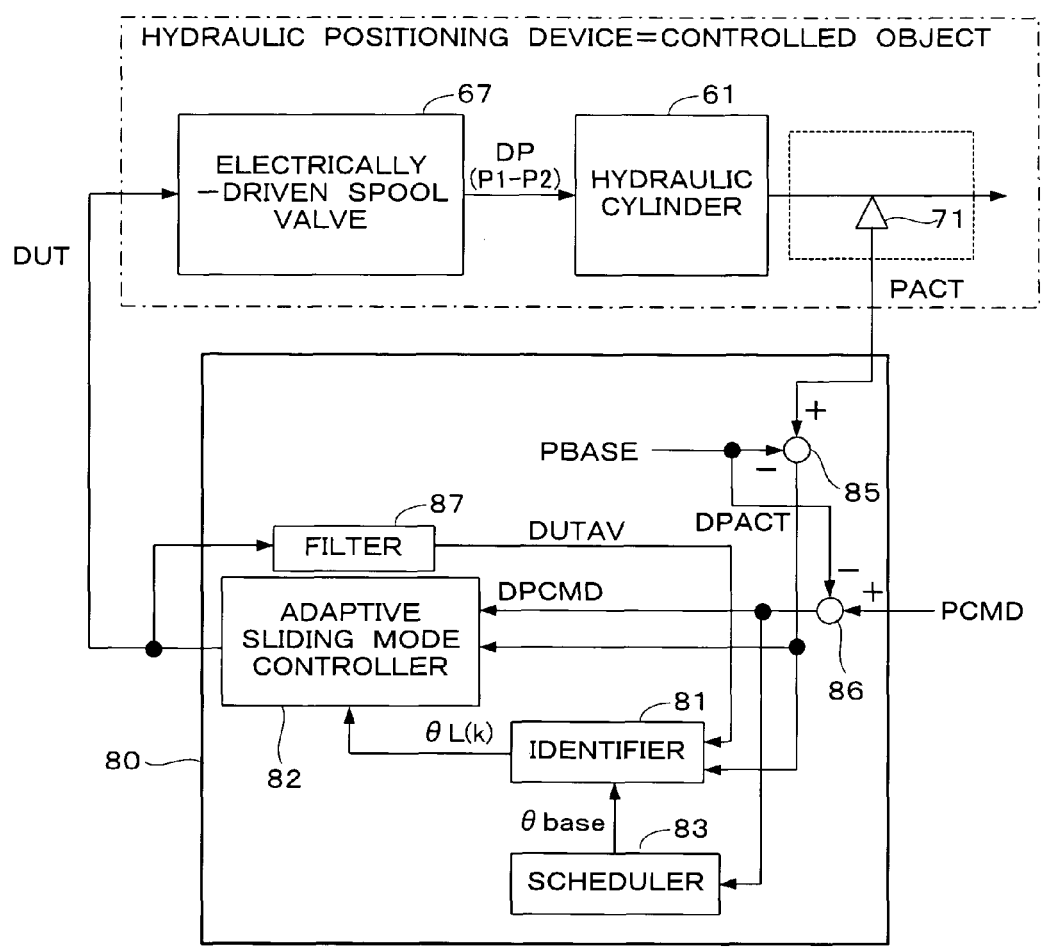
FIG. 25 is a block diagram of a control system including the hydraulic positioning device shown in FIG. 25.

FIG. 25 is a block diagram showing a control system for controlling the hydraulic positioning device shown in FIG. 24 with an adaptive sliding mode controller.

The control system 80 includes an identifier 81, an adaptive sliding mode controller 82, a scheduler 83, subtractors 85, 86, and a filter 87. The control system 80 is realized by processes which are carried out by a CPU included in the ECU 72.

The subtractor 85 subtracts a reference value PBASE from the detected position PACT to calculate a detected position deviation amount DPACT. The subtractor 86 subtracts the reference value PBASE from the target position PCMD to calculate a target value DPCMD. The reference value PBASE is preset to an optimum value based on the operating characteristics of the hydraulic positioning device.

The detected position PACT and the detected position deviation amount DPACT in the present embodiment correspond respectively to the throttle opening TH and the throttle valve opening deviation amount DTH in the first embodiment. The target position PCMD and the target value DPCMD in the present embodiment correspond respectively to the target opening THR and the target value DTHR in the first embodiment.

The filter 87 performs the filtering process that attenuates high frequency components of the control quantity DUT. More specifically, the filtered control quantity DUTAV is calculated by moving-averaging the control quantity DUT, and input to the identifier 81.

The scheduler 83, similarly to the model parameter scheduler 25 in the first embodiment, calculates a reference model parameter vector θbase according to the target value DPCMD, and supplies the reference model parameter vector θ base to the identifier 81.

The identifier 81, similarly to the model parameter identifier 22 in the first embodiment, calculates a corrected model parameter vector θL(k) according to the filtered control quantity DUTAV corresponding to the control quantity DUT as a control input and the detected position deviation amount DPACT as a control output. Specifically, the identifier 81 calculates an identifying error ide(n) from the equations (52) and (53) shown below. An input/output parameter vector ζ(n) is defined from the equation (54) shown below.

$$ide(n)=DPACT(n)(k)-DPACTHAT(n) \tag{52}$$

$$DPACTHAT(n)=\theta^*(n-1)^T\zeta(n) \tag{53}$$

$$\zeta^T(n)=[DPACT(n-1), DPACT(n-2), DUTAV(n-1), 1] \tag{54}$$

The identifying error ide(n) is applied to the equation (30), and the equations (14f), (14g), (19b), and (33) are used to calculate a model parameter vector θ(n). The calculated model parameter vector θ(n) is subjected to a first limit process, which is similar to the first limit process in the first embodiment, to calculate a model parameter vector θ*(n). The model parameter vector θ*(n) is oversampled and moving-averaged to calculate a model parameter vector θ'(k). The model parameter vector θ'(k) is subjected to a second limit process, which is similar to the second limit process in the first embodiment, to calculate a corrected model parameter vector θL(k).

The adaptive sliding mode controller 82, similarly to the adaptive sliding mode controller 21 in the first embodiment, applies the detected position deviation amount DPACT to the equation (55) shown below to calculate an equivalent control input Ueq(k). The adaptive sliding mode controller 82 calculates a switching function value σ(k) from the equation (56) shown below, and applies the switching function value σ(k) to the equations (9) and (10c) described above to calculate a reaching law input Urch(k) and an adaptive law input Uadp(k). A switching function setting parameter VPOLE and control gains F and G are set to values suitable for the controlled object in the present embodiment, i.e., the hydraulic positioning device.

$$Ueq(k) = (1/b1)\{(1-a1-VPOLE)DPACT(k) + \\ (VPOLE-a2)DPACT(k-k0)-c1\} \tag{55}$$

$$\sigma(k) = (DPACT(k)-DPCMD(k)) + \\ VPOLE(DPACT(k-k0)-DPCMD(k-k0)) \tag{56}$$

The adaptive sliding mode controller 82 applies the switching function value σ(k) calculated from the equation (56) to the above equation (22) to calculate a nonlinear input Unl(k). A nonlinear input gain Knl is set a value suitable for the controlled object in the present embodiment.

The adaptive sliding mode controller 82 calculates a damping input Udamp(k) from the equation (57) shown below. A damping control gain Kdamp is set to a value suitable for the controlled object in the present embodiment.

$$U\text{damp}(k) = -K\text{damp} \times (DACT(k) - DACT(k-1))/b1 \quad (57)$$

The adaptive sliding mode controller 82 adds the equivalent control input Ueq(k), the reaching law input Urch(k), the adaptive law input Uadp(k), the nonlinear input Unl(k), and the damping input Udamp(k) to thereby calculate a control input Usl (=DUT).

Since the control system 80 performs a control process in which the control output TH and the target opening THR in the first embodiment are replaced respectively by the control output PACT and the target position PCMD, the control output PACT is controlled to follow up the target position PCMD with good robustness as similar to the first embodiment.

Further, the model parameters is identified using the filtered control quantity DUTAV which is calculated by the moving-averaging of the control quantity DUT. This makes it possible to suppress variations in model parameters which occurs at intervals of a short period corresponding to the control period ΔTCTL, and to improve controllability of the position PACT of the piston 64.

According to the present embodiment, the hydraulic positioning device shown in FIG. 25 corresponds to a plant, and the ECU 72 constitutes a controller, an identifier, a filter which are recited in the claimed invention.

The present invention is not limited to the above embodiments, but various modifications may be made. For example, the filtering process performed by the filter 28 or 87 is not limited to the moving-averaging calculation. The filter 28 or 87 may perform other lowpass-filtering processes which attenuate high frequency components of the control quantity DUT.

Further, while the hydraulic positioning device is shown in the second embodiment, the control process carried out by the control system 80 in the second embodiment may be applied to a pneumatic positioning device which uses pneumatic pressure instead of hydraulic pressure.

The response-specifying controller that performs a feedback control to make an output of a controlled object coincide with a target value and specifies the damping characteristic of a control deviation of the feedback control process, is not limited to an adaptive sliding mode controller. A controller for performing a back stepping control which realizes control results similar to those of the sliding mode control, may be used as a response-specifying controller.

In the above embodiments, the period of the calculation for identifying model parameters is set to a period which is equal to the identification period ΔTID. However, the period of the calculation for identifying model parameters may not necessarily be set to the same period as the identification period ΔTID, but may be set to a period between the control period ΔTCTL and the identification period ΔTID, or a period which is longer than the identification period ΔTID.

In the above embodiments, the parameter k0 indicative of the sampling time interval for the deviation e(k) involved in the calculation of the switching function value σ is set to ΔTID/ΔTCTL which is a discrete time corresponding to the identification period ΔTID. Alternatively, the parameter k0 may be set to another integer which is greater than "1".

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for a plant, including a controller for controlling said plant based on a controlled object model which is obtained by modeling said plant,
    said controlled object model being modeled using an input and an output of said plant which are sampled at intervals of a sampling period which is longer than a control period of said controller, and
    the sampled input of said plant being a filtered control output which is obtained by filtering an output of said controller,
    wherein said controller carries out a control process of said plant at intervals of the control period.

2. A control system according to claim 1, wherein said controller performs a feedback control of calculating the output of said controller to make the output of said plant coincide with a target value, said controller being capable of specifying a damping characteristic of a deviation between the output of said plant and the target value.

3. A control system according to claim 2, wherein said controller is a sliding mode controller.

4. A control system according to claim 3, wherein said sliding mode controller calculates a value of a switching function defined as a linear function of the deviation between the output of said plant and the target value, and a sampling time interval of the deviation which is used to calculate the value of the switching function is equal to the sampling period.

5. A control system according to claim 1, further including an identifier for identifying at least one model parameter of the controlled object model, wherein said controller calculates the output of said controller using the at least one model parameter identified by said identifier, and said identifier identifies the at least one model parameter at intervals of the sampling period, using the filtered output of said controller.

6. A control system according to claim 1, wherein said plant includes a throttle valve of an internal combustion engine and a throttle valve actuating device having an actuator for actuating said throttle valve, and said controller calculates a parameter for determining a control input to be applied to said throttle valve actuating device to make an opening of said throttle valve coincide with a target opening.

7. A control system for a plant, comprising:
    an identifier for identifying at least one model parameter of a controlled object model which is obtained by modeling said plant;
    a controller for controlling said plant using the at least one model parameter identified by said identifier, said controller carrying out a control process of said plant at intervals of a control period; and
    a filter for filtering an output of said controller,
    wherein said controlled object model is modeled using an input and an output of said plant which are sampled at intervals of a sampling period which is longer than the control period of said controller, and said identifier identifies the at least one model parameter based on an output of said filter and the output of said plant.

8. A control method for a plant, comprising the steps of:
a) modeling said plant using an input and an output of said plant which are sampled at intervals of a sampling period, to obtain a controlled object model of said plant; and
b) carrying out a control process of said plant based on the controlled object model at intervals of a control period which is shorter than the sampling period, to calculate a control output applied to said plant,
wherein the sampled input of said plant is a filtered control output which is obtained by filtering the control output.

9. A control method according to claim 8, wherein a feedback control of calculating the control output is performed to make the output of said plant coincide with a target value, and a damping characteristic of a deviation between the output of said plant and the target value being specifiable.

10. A control method according to claim 9, wherein the feedback control is a sliding mode control.

11. A control method according to claim 10, further including the step of calculating a value of a switching function defined as a linear function of the deviation between the output of said plant and the target value, wherein a sampling time interval of the deviation which is used to calculate the value of the switching function is equal to the sampling period.

12. A control method according to claim 8, further including the step of identifying at least one model parameter of the controlled object model, wherein the control output is calculated using the at least one identified model parameter, and the at least one model parameter is identified at intervals of the sampling period, using the filtered control output.

13. A control method according to claim 8, wherein said plant includes a throttle valve of an internal combustion engine and a throttle valve actuating device having an actuator for actuating said throttle valve, and a parameter for determining a control input to be applied to said throttle valve actuating device is calculated to make an opening of said throttle valve coincide with a target opening.

14. A control method for a plant, comprising the steps of:
a) identifying at least one model parameter of a controlled object model which is obtained by modeling said plant;
b) carrying out a control process of said plant using the at least one identified model parameter at intervals of a control period, to calculate a control output applied to said plant,; and
c) filtering the control output,
wherein said controlled object model is modeled using an input and an output of said plant which are sampled at intervals of a sampling period which is longer than the control period, and the at least one model parameter is identified based on the filtered control output and the output of said plant.

15. A computer program embodied on a computer readable medium for causing a computer to carry out a control method for a plant, comprising the steps of:
a) identifying at least one model parameter of a controlled object model which is obtained by modeling said plant;
b) carrying out a control process of said plant using the at least one identified model parameter at intervals of a control period, to calculate a control output applied to said plant,; and
c) filtering the control output,
wherein said controlled object model is modeled using an input and an output of said plant which are sampled at intervals of a sampling period which is longer than the control period, and the at least one model parameter is identified based on the filtered control output and the output of said plant.

16. A computer program embodied on a computer readable medium according to claim 15, wherein a feedback control of calculating the control output is performed to make the output of said plant coincide with a target value, and a damping characteristic of a deviation between the output of said plant and the target value being specifiable.

17. A computer program embodied on a computer readable medium according to claim 16, wherein the feedback control is a sliding mode control.

18. A computer program embodied on a computer readable medium according to claim 17, further including the step of calculating a value of a switching function defined as a linear function of the deviation between the output of said plant and the target value, wherein a sampling time interval of the deviation which is used to calculate the value of the switching function is equal to the sampling period.

19. A computer program embodied on a computer readable medium according to claim 15, further including the step of identifying at least one model parameter of the controlled object model, wherein the control output is calculated using the at least one identified model parameter, and the at least one model parameter is identified at intervals of the sampling period, using the filtered control output.

20. A computer program embodied on a computer readable medium according to claim 15, wherein said plant includes a throttle valve of an internal combustion engine and a throttle valve actuating device having an actuator for actuating said throttle valve, and a parameter for determining a control input to be applied to said throttle valve actuating device is calculated to make an opening of said throttle valve coincide with a target opening.

* * * * *